United States Patent
Takatsu et al.

(10) Patent No.: US 10,236,727 B2
(45) Date of Patent: Mar. 19, 2019

(54) WIRELESS POWER TRANSFER SYSTEM AND VEHICLE POWER SUPPLY DEVICE

(71) Applicant: IHI CORPORATION, Tokyo (JP)

(72) Inventors: Yuji Takatsu, Tokyo (JP); Akio Ueda, Tokyo (JP); Susumu Tokura, Tokyo (JP); Sho Hashizume, Tokyo (JP); Kei Akune, Tokyo (JP); Tooru Hayashi, Tokyo (JP); Shoei Shibata, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 15/277,034

(22) Filed: Sep. 27, 2016

(65) Prior Publication Data

US 2017/0018963 A1     Jan. 19, 2017

Related U.S. Application Data

(63) Continuation of application No. PCT/JP2015/060005, filed on Mar. 30, 2015.

(30) Foreign Application Priority Data

Mar. 31, 2014    (JP) .................................. 2014-074261

(51) Int. Cl.
   *H01F 27/42*       (2006.01)
   *H01F 37/00*       (2006.01)
   (Continued)

(52) U.S. Cl.
   CPC ............. *H02J 50/50* (2016.02); *B60L 11/182* (2013.01); *B60L 11/1829* (2013.01);
   (Continued)

(58) Field of Classification Search
   CPC ................ B60L 11/182; B60L 11/1829; B60L 2230/10; B60L 11/1833; H02J 7/025;
   (Continued)

(56) References Cited

U.S. PATENT DOCUMENTS 5,821,731 A * 10/1998  Kuki ................... B60L 11/1805
                                                                    320/108
8,035,255 B2    10/2011  Kurs
(Continued)

FOREIGN PATENT DOCUMENTS

CN          102089955 A     6/2011
JP          2011-035953 A   2/2011
(Continued)

*Primary Examiner* — Rexford Barnie
*Assistant Examiner* — Rasem Mourad
(74) *Attorney, Agent, or Firm* — Volpe and Koenig, P.C.

(57) ABSTRACT

A wireless power transfer system includes: a primary coil support member provided with a fitting member that is fit with a fit member, the primary coil support member being configured to support the power supply primary coil; a secondary coil support member provided with the fit member with which the fitting member is fit, the secondary coil support member being configured to support the power supply secondary coil; and a posture/position adjustment mechanism capable of adjusting a relative posture or position between the primary coil support member and the secondary coil support member to change the posture between a releasing posture and a fitting posture. When the relative posture is changed from the releasing posture to the fitting posture by the adjustment of the posture/position adjustment mechanism, the power supply apparatus performs wireless power transfer from the power supply primary coil to the power supply secondary coil.

2 Claims, 16 Drawing Sheets

(51) Int. Cl.
*H01F 38/00* (2006.01)
*H02J 50/50* (2016.01)
*H02J 50/12* (2016.01)
*H02J 17/00* (2006.01)
*H02J 7/02* (2016.01)
*H02J 50/10* (2016.01)
*H02J 50/90* (2016.01)
*B60L 11/18* (2006.01)
*E04H 6/22* (2006.01)

(52) U.S. Cl.
CPC .......... *B60L 11/1833* (2013.01); *H02J 7/025* (2013.01); *H02J 17/00* (2013.01); *H02J 50/10* (2016.02); *H02J 50/12* (2016.02); *H02J 50/90* (2016.02); *B60L 2230/10* (2013.01); *E04H 6/22* (2013.01); *Y02T 10/7005* (2013.01); *Y02T 10/7088* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC . H02J 50/50; H02J 50/10; H02J 50/12; Y02T 90/125; Y02T 90/121; Y02T 90/122; E04H 6/22
See application file for complete search history.

(56) References Cited

U.S. PATENT DOCUMENTS

| | | |
|---|---|---|
| 8,106,539 B2 | 1/2012 | Schatz |
| 2005/0207876 A1* | 9/2005 | Springwater ............. E04H 6/24 414/231 |
| 2010/0117596 A1 | 5/2010 | Cook et al. |
| 2011/0175455 A1* | 7/2011 | Hashiguchi ............. H02J 5/005 307/104 |
| 2011/0181240 A1* | 7/2011 | Baarman ............... B60L 11/182 320/108 |
| 2011/0187320 A1* | 8/2011 | Murayama ............... H02J 7/00 320/108 |
| 2013/0278210 A1 | 10/2013 | Cook et al. |
| 2014/0015312 A1* | 1/2014 | Niizuma ................... E04H 6/22 307/9.1 |
| 2014/0217966 A1* | 8/2014 | Schneider ............... H02J 50/12 320/108 |

FOREIGN PATENT DOCUMENTS

| | | | |
|---|---|---|---|
| JP | 2011035953 A | * | 2/2011 |
| JP | 2011-060260 A | | 3/2011 |
| JP | 2011-080260 A | | 4/2011 |
| JP | 2011-097814 A | | 5/2011 |
| JP | 2012-085472 A | | 4/2012 |
| JP | 2013-017274 A | | 1/2013 |

* cited by examiner

VIEWED FROM A-A ARROW

WIRELESS POWER TRANSFER SYSTEM AND VEHICLE POWER SUPPLY DEVICE

CROSS-REFERENCE TO RELATED APPLICATIONS

This application is a continuation application of International Application No. PCT/JP2015/060005, filed Mar. 30, 2015, which claims priority to Japanese Patent Application No. 2014-074261 filed Mar. 31, 2014. The contents of these applications are incorporated herein by reference in their entirety.

TECHNICAL FIELD

The present disclosure relates to a wireless power transfer system and a vehicle power supply device that supplies electric power to a vehicle capable of receiving power supply.

BACKGROUND ART

In recent years, vehicles driven by electric power have been used.

This leads to a need for supplying electric power to a vehicle.

For example, electric power is supplied to a parked vehicle by a power supply apparatus.

The power supply apparatus is capable of supplying electric power to a vehicle in a wireless manner.

For example, such an idea has been studied that a vehicle has a wireless type power supply secondary coil on a bottom part thereof, and a power supply primary coil is provided below the vehicle to supply electric power to the vehicle.

FIGS. 16A and 16B are conceptual diagrams of a wireless power transfer system.

The concept illustrated in FIGS. 16A and 16B has been disclosed in U.S. Pat. No. 8,035,255.

When the wireless type is employed, it is desired that power is supplied with a small energy loss from the power supply primary coil to the power supply secondary coil.

CITATION LIST

Patent Literature

Patent Literature 1: Japanese Unexamined Patent Publication No. 2011-60260
Patent Literature 2: Japanese Unexamined Patent Publication No. 2011-97814
Patent Literature 3: U.S. Pat. No. 8,035,255
Patent Literature 4: U.S. Pat. No. 8,106,539

SUMMARY

Technical Problem

In a wireless power transfer system, electric power is supplied in a wireless manner from a power supply primary coil to a power supply secondary coil via a magnetic field formed in a space between the power supply primary coil and the power supply secondary coil.

This feature imposes a reasonable restriction on relative position displacement between the power supply primary coil and the power supply secondary coil (such a state that the power supply primary coil and the power supply secondary coil are not arranged most closely, i.e., such a state that the center of the power supply primary coil and the center of the power supply secondary coil are not aligned when the shapes of the power supply primary coil and the power supply secondary coil are the same). An attempt to supply electric power while exceeding the restriction on relative position displacement leads to failure, that is, a large energy loss.

The present disclosure describes a wireless power transfer system and a vehicle power supply device capable of supplying electric power efficiently while suppressing position displacement.

Solution to Problem

In order to achieve the above-mentioned purpose, an aspect of the present disclosure is a wireless power transfer system including: a power receiving apparatus having a power supply secondary coil that is a coil circuit capable of performing wireless power transfer, the power receiving apparatus being capable of supplying electric power to a load; a power supply apparatus having a power supply primary coil that is a coil circuit capable of performing the wireless power transfer, and a drive circuit that drives the power supply primary coil; a primary coil support member provided with a fitting member that is fit with a fit member, the primary coil support member being configured to support the power supply primary coil; a secondary coil support member provided with the fit member with which the fitting member is fit, the secondary coil support member being configured to support the power supply secondary coil; and a posture/position adjustment mechanism capable of adjusting a relative posture or position between the primary coil support member and the secondary coil support member to change the posture between a releasing posture and a fitting posture, the releasing posture being such a posture that the fitting member releases the fit member, the fitting posture being such a posture that the fitting member is fit with the fit member, wherein the posture/position adjustment mechanism adjusts the relative posture or position between the primary coil support member and the secondary coil support member such that the releasing posture is changed to the fitting posture, and the power supply apparatus performs the wireless power transfer from the power supply primary coil to the power supply secondary coil in the fitting posture.

Owing to the above-mentioned configuration, the power receiving apparatus has the power supply secondary coil that is the coil circuit capable of performing the wireless power transfer, and the power receiving apparatus is capable of supplying electric power to the load. The power supply apparatus has the power supply primary coil that is the coil circuit capable of performing the wireless power transfer, and the drive circuit that drives the power supply primary coil. The primary coil support member is provided with the fitting member that is fit with the fit member, and the primary coil support member supports the power supply primary coil. The secondary coil support member is provided with the fit member with which the fitting member is fit, and the secondary coil support member supports the power supply secondary coil. The posture/position adjustment mechanism is capable of adjusting the relative posture or position between the primary coil support member and the secondary coil support member to change the posture between the releasing posture and the fitting posture. The releasing posture is such a posture that the fitting member releases the fit member, and the fitting posture is such a posture that the fitting member is fit with the fit member. The posture/position adjustment mechanism adjusts the relative posture or position between the primary coil support member and the secondary coil support member such that the releasing posture is changed to the fitting posture, and the power supply apparatus performs the wireless power transfer from the power supply primary coil to the power supply secondary coil in the fitting posture.

As a result, the relative posture or position between the power supply primary coil and the power supply secondary coil is adjusted, and the wireless power transfer can be efficiently performed from the power supply primary coil to the power supply secondary coil.

In order to achieve the above-mentioned purpose, an aspect of the present disclosure is a wireless power transfer system including: a power receiving apparatus having a power supply secondary coil that is a coil circuit capable of performing wireless power transfer, the power receiving apparatus being capable of supplying electric power to a load; a power supply apparatus having a power supply primary coil that is a coil circuit capable of performing the wireless power transfer, and a drive circuit that drives the power supply primary coil; a primary coil support member provided with a fitting member that is fit with a fit member, the primary coil support member being configured to support the power supply primary coil; a moving body provided with the fit member with which the fitting member is fit, the moving body being capable of supporting the power supply secondary coil at a predetermined position in a predetermined posture; and a posture/position adjustment mechanism capable of adjusting a relative posture or position between the primary coil support member and the moving body to change the posture between a releasing posture and a fitting posture, the releasing posture being such a posture that the fitting member releases the fit member, the fitting posture being such a posture that the fitting member is fit with the fit member, wherein when the moving body supports the power supply secondary coil at the predetermined position in the predetermined posture and is located between the power supply primary coil and the power supply secondary coil, the posture/position adjustment mechanism adjusts the relative posture or position between the primary coil support member and the moving body such that the releasing posture is changed to the fitting posture, and the power supply apparatus performs the wireless power transfer from the power supply primary coil to the power supply secondary coil in the fitting posture.

Owing to the above-mentioned configuration, the power receiving apparatus has the power supply secondary coil that is the coil circuit capable of performing the wireless power transfer, and the power receiving apparatus is capable of supplying electric power to the load. The power supply apparatus has the power supply primary coil that is the coil circuit capable of performing the wireless power transfer, and the drive circuit that drives the power supply primary coil. The primary coil support member is provided with the fitting member that is fit with the fit member, and the primary coil support member supports the power supply primary coil. The moving body is provided with the fit member with which the fitting member is fit, and the moving body is capable of supporting the power supply secondary coil at the predetermined position in the predetermined posture. The posture/position adjustment mechanism is capable of adjusting the relative posture or position between the primary coil support member and the moving body to change the posture between the releasing posture and the fitting posture. The releasing posture is such a posture that the fitting member releases the fit member, and the fitting posture is such a posture that the fitting member is fit with the fit member. When the moving body supports the power supply secondary coil at the predetermined position in the predetermined posture and is located between the power supply primary coil and the power supply secondary coil, the posture/position adjustment mechanism adjusts the relative posture or position between the primary coil support member and the moving body such that the releasing posture is changed to the fitting posture, and the power supply apparatus performs the wireless power transfer from the power supply primary coil to the power supply secondary coil in the fitting posture.

As a result, the relative posture or position between the power supply primary coil and the power supply secondary coil is adjusted, and the wireless power transfer can be efficiently performed from the power supply primary coil to the power supply secondary coil.

In order to achieve the above-mentioned purpose, an aspect of the present disclosure is a wireless power transfer system including: a power receiving apparatus having a power supply secondary coil that is a coil circuit capable of performing wireless power transfer, the power receiving apparatus being capable of supplying electric power to a load; a power supply apparatus having a power supply primary coil that is a coil circuit capable of performing the wireless power transfer, and a drive circuit that drives the power supply primary coil; a primary coil support member provided with a first fitting member that is fit with a first fit member, the primary coil support member being configured to support the power supply primary coil; a moving body provided with the first fit member with which the first fitting member is fit, and provided with a second fitting member that is fit with a second fit member; a secondary coil support member provided with the second fit member with which the second fitting member is fit, the secondary coil support member being configured to support the power supply secondary coil; a first posture/position adjustment mechanism that is a posture/position adjustment mechanism capable of adjusting a relative posture or position between the primary coil support member and the moving body to change the posture between a first releasing posture in which the first fitting member releases the first fit member and a first fitting posture in which the first fitting member is fit with the first fit member; and a second posture/position adjustment mechanism that is a posture/position adjustment mechanism capable of adjusting a relative posture or position between the moving body and the secondary coil support member to change the posture between a second releasing posture in which the second fitting member releases the second fit member and a second fitting posture in which the second fitting member is fit with the second fit member, wherein when the moving body is located between the power supply primary coil and the power supply secondary coil, the first posture/position adjustment mechanism adjusts the relative posture or position between the primary coil support member and the moving body such that the first releasing posture is changed to the first fitting posture, the second posture/position adjustment mechanism adjusts the relative posture or position between the moving body and the secondary coil support member such that the second releasing posture is changed to the second fitting posture, and the power supply apparatus performs the wireless power transfer from the power supply primary coil to the power supply secondary coil in the first fitting posture and the second fitting posture.

Owing to the above-mentioned configuration, the power receiving apparatus has the power supply secondary coil that is the coil circuit capable of performing the wireless power transfer, and the power receiving apparatus is capable of supplying electric power to the load. The power supply apparatus has the power supply primary coil that is the coil circuit capable of performing the wireless power transfer, and the drive circuit that drives the power supply primary coil. The primary coil support member is provided with the first fitting member that is fit with the first fit member, and the primary coil support member supports the power supply primary coil. The first fit member with which the first fitting member is fit is provided, and the second fitting member that is fit with the second fit member is provided. The moving body is provided with the first fit member with which the first fitting member is fit, and provided with the second fitting member that is fit with the second fit member. The secondary coil support member is provided with the second fit member with which the second fitting member is fit, and the secondary coil support member supports the power supply secondary coil. The first posture/position adjustment mechanism is capable of adjusting the relative posture or position between the primary coil support member and the moving body to change the posture between the first releasing posture in which the first fitting member releases the first fit member and the first fitting posture in which the first fitting member is fit with the first fit member. The second posture/position adjustment mechanism is capable of adjusting the relative posture or position between the moving body and the secondary coil support member to change the posture between the second releasing posture in which the second fitting member releases the second fit member and the second fitting posture in which the second fitting member is fit with the second fit member. When the moving body is located between the power supply primary coil and the power supply secondary coil, the first posture/position adjustment mechanism adjusts the relative posture or position between the primary coil support member and the moving body such that the first releasing posture is changed to the first fitting posture, the second posture/position adjustment mechanism adjusts the relative posture or position between the moving body and the secondary coil support member such that the second releasing posture is changed to the second fitting posture, and the power supply apparatus performs the wireless power transfer from the power supply primary coil to the power supply secondary coil in the first fitting posture and the second fitting posture.

As a result, the relative posture or position between the power supply primary coil and the power supply secondary coil is adjusted, and the wireless power transfer can be efficiently performed from the power supply primary coil to the power supply secondary coil.

In order to achieve the above-mentioned purpose, an aspect of the present disclosure is a vehicle power supply device that supplies electric power to a vehicle, the vehicle being provided with a power supply secondary coil, the vehicle power supply device including: a main structure provided with a storage space arranged along a moving path; a moving carriage having a moving carriage main body capable of supporting a vehicle support structure that supports the vehicle and moving on the moving path; a power supply apparatus provided at a specific position that is at least one particular position on the moving path, the power supply apparatus having a power supply primary coil capable of performing wireless power transfer and a drive circuit that drives the power supply primary coil; a primary coil support member provided at the specific position and provided with a fitting member that is fit with a fit member, the primary coil support member being configured to support the power supply primary coil; a secondary coil support member provided at the vehicle and provided with the fit member with which the fitting member is fit, the secondary coil support member being configured to support the power supply secondary coil; and a posture/position adjustment mechanism provided at the specific position and capable of adjusting a relative posture or position between the primary coil support member and the secondary coil support member to change the posture between a releasing posture in which the fitting member releases the fit member and a fitting posture in which the fitting member is fit with the fit member, wherein when the moving carriage stops at the specific position on the moving path, the posture/position adjustment mechanism adjusts the relative posture or position between the primary coil support member and the secondary coil support member such that the releasing posture is changed to the fitting posture, and the power supply apparatus performs the wireless power transfer from the power supply primary coil to the power supply secondary coil in the fitting posture.

Owing to the above-mentioned configuration, the power supply secondary coil is provided at the vehicle. The main structure is provided with the storage space arranged along the moving path. The moving carriage has the moving carriage main body capable of supporting the vehicle support structure that supports the vehicle and moving on the moving path. The power supply apparatus is provided at the specific position that is at least one particular position on the moving path, and the power supply apparatus has the power supply primary coil capable of performing the wireless power transfer and the drive circuit that drives the power supply primary coil. The primary coil support member is provided at the specific position and provided with the fitting member that is fit with the fit member, and the primary coil support member supports the power supply primary coil. The secondary coil support member is provided at the vehicle and provided with the fit member with which the fitting member is fit, and the secondary coil support member supports the power supply secondary coil. The posture/position adjustment mechanism is provided at the specific position and capable of adjusting the relative posture or position between the primary coil support member and the secondary coil support member to change the posture between the releasing posture in which the fitting member releases the fit member and the fitting posture in which the fitting member is fit with the fit member. When the moving carriage stops at the specific position on the moving path, the posture/position adjustment mechanism adjusts the relative posture or position between the primary coil support member and the secondary coil support member such that the releasing posture is changed to the fitting posture, and the power supply apparatus performs the wireless power transfer from the power supply primary coil to the power supply secondary coil in the fitting posture.

As a result, the relative posture or position between the power supply primary coil and the power supply secondary coil is adjusted, and electric power can be efficiently supplied to the vehicle supported by the moving carriage that moves along the moving path.

In order to achieve the above-mentioned purpose, an aspect of the present disclosure is a vehicle power supply device that supplies electric power to a vehicle, the vehicle power supply device including: a main structure provided with a storage space arranged along a moving path; a vehicle support structure that is a structure capable of supporting the vehicle; a moving carriage having a moving carriage main body capable of supporting the vehicle support structure that supports the vehicle and moving on the moving path; a power supply secondary coil provided at the vehicle support structure; a power supply apparatus provided at a specific position that is at least one particular position on the moving path, the power supply apparatus having a power supply primary coil capable of performing wireless power transfer and a drive circuit that drives the power supply primary coil; a primary coil support member provided at the specific position and provided with a fitting member that is fit with a fit member, the primary coil support member being configured to support the power supply primary coil; a secondary coil support member provided at the vehicle support structure and provided with the fit member with which the fitting member is fit, the secondary coil support member being configured to support the power supply secondary coil; and a posture/position adjustment mechanism provided at the specific position and capable of adjusting a relative posture or position between the primary coil support member and the secondary coil support member to change the posture between a releasing posture in which the fitting member releases the fit member and a fitting posture in which the fitting member is fit with the fit member, wherein when the moving carriage stops at the specific position on the moving path, the posture/position adjustment mechanism adjusts the relative posture or position between the primary coil support member and the secondary coil support member such that the releasing posture is changed to the fitting posture, the power supply apparatus performs the wireless power transfer from the power supply primary coil to the power supply secondary coil in the fitting posture, and electric power supplied by the wireless power transfer is supplied to the vehicle.

Owing to the above-mentioned configuration, the main structure is provided with the storage space arranged along the moving path. The vehicle support structure is the structure capable of supporting the vehicle. The moving carriage has the moving carriage main body capable of supporting the vehicle support structure that supports the vehicle and moving on the moving path. The power supply secondary coil is provided at the vehicle support structure. The power supply apparatus is provided at the specific position that is at least one particular position on the moving path, and the power supply apparatus has the power supply primary coil capable of performing the wireless power transfer and the drive circuit that drives the power supply primary coil. The primary coil support member is provided at the specific position and provided with the fitting member that is fit with the fit member, and the primary coil support member supports the power supply primary coil. The secondary coil support member is provided at the vehicle support structure and provided with the fit member with which the fitting member is fit, and the secondary coil support member supports the power supply secondary coil. The posture/position adjustment mechanism is provided at the specific position and capable of adjusting the relative posture or position between the primary coil support member and the secondary coil support member to change the posture between the releasing posture in which the fitting member releases the fit member and the fitting posture in which the fitting member is fit with the fit member. When the moving carriage stops at the specific position on the moving path, the posture/position adjustment mechanism adjusts the relative posture or position between the primary coil support member and the secondary coil support member such that the releasing posture is changed to the fitting posture, the power supply apparatus performs the wireless power transfer from the power supply primary coil to the power supply secondary coil in the fitting posture, and electric power supplied by the wireless power transfer is supplied to the vehicle.

As a result, the relative posture or position between the power supply primary coil and the power supply secondary coil is adjusted, and electric power can be efficiently supplied to the vehicle supported by the moving carriage that moves along the moving path.

In order to achieve the above-mentioned purpose, an aspect of the present disclosure is a vehicle power supply device that supplies electric power to a vehicle, the vehicle being provided with a power supply secondary coil, the vehicle power supply device including: a main structure provided with a storage space arranged along a moving path; a moving carriage having a moving carriage main body capable of supporting the vehicle and moving on the moving path; a power supply apparatus provided at a specific position that is at least one particular position on the moving path, the power supply apparatus having a power supply primary coil capable of performing wireless power transfer and a drive circuit that drives the power supply primary coil; a primary coil support member provided at the specific position and provided with a fitting member that is fit with a fit member, the primary coil support member being configured to support the power supply primary coil; and a posture/position adjustment mechanism provided at the specific position and capable of adjusting a relative posture or position between the primary coil support member and the moving carriage to change the posture between a releasing posture in which the fitting member releases the fit member and a fitting posture in which the fitting member is fit with the fit member, wherein when the moving carriage stops at the specific position on the moving path, the posture/position adjustment mechanism adjusts the relative posture or position between the primary coil support member and the moving carriage such that the releasing posture is changed to the fitting posture, and the power supply apparatus performs the wireless power transfer from the power supply primary coil to the power supply secondary coil in the fitting posture.

Owing to the above-mentioned configuration, the power supply secondary coil is provided at the vehicle. The main structure is provided with the storage space arranged along the moving path. The moving carriage has the moving carriage main body capable of supporting the vehicle and moving on the moving path. The power supply apparatus is provided at the specific position that is at least one particular position on the moving path, and the power supply apparatus has the power supply primary coil capable of performing the wireless power transfer and the drive circuit that drives the power supply primary coil. The primary coil support member is provided at the specific position and provided with the fitting member that is fit with the fit member, and the primary coil support member supports the power supply primary coil. The posture/position adjustment mechanism is provided at the specific position and capable of adjusting the relative posture or position between the primary coil support member and the moving carriage to change the posture between the releasing posture in which the fitting member releases the fit member and the fitting posture in which the fitting member is fit with the fit member. When the moving carriage stops at the specific position on the moving path, the posture/position adjustment mechanism adjusts the relative posture or position between the primary coil support member and the moving carriage such that the releasing posture is changed to the fitting posture, and the power supply apparatus performs the wireless power transfer from the power supply primary coil to the power supply secondary coil in the fitting posture.

As a result, the relative posture or position between the power supply primary coil and the power supply secondary coil is adjusted, and electric power can be efficiently supplied to the vehicle supported by the moving carriage that moves along the moving path.

In order to achieve the above-mentioned purpose, an aspect of the present disclosure is a vehicle power supply device that supplies electric power to a vehicle, the vehicle power supply device including: a main structure provided with a storage space arranged along a moving path; a vehicle support structure that is a structure capable of supporting the vehicle; a moving carriage provided with a fit member with which a fitting member is fit, the moving carriage having a moving carriage main body capable of supporting the vehicle support structure that supports the vehicle and moving on the moving path so as to be capable of supporting the vehicle at a predetermined position in a predetermined posture; a power supply secondary coil provided at the vehicle support structure; a power supply apparatus provided at a specific position that is at least one particular position on the moving path, the power supply apparatus having a power supply primary coil capable of performing wireless power transfer and a drive circuit that drives the power supply primary coil; a primary coil support member provided at the specific position and provided with the fitting member that is fit with the fit member, the primary coil support member being configured to support the power supply primary coil; and a posture/position adjustment mechanism provided at the specific position and capable of adjusting a relative posture or position between the primary coil support member and the moving carriage to change the posture between a releasing posture in which the fitting member releases the fit member and a fitting posture in which the fitting member is fit with the fit member, wherein when the moving carriage stops at the specific position on the moving path, the posture/position adjustment mechanism adjusts the relative posture or position between the primary coil support member and the moving carriage such that the releasing posture is changed to the fitting posture, the power supply apparatus performs the wireless power transfer from the power supply primary coil to the power supply secondary coil in the fitting posture, and electric power supplied by the wireless power transfer is supplied to the vehicle.

Owing to the above-mentioned configuration, the main structure is provided with the storage space arranged along the moving path. The vehicle support structure is the structure capable of supporting the vehicle. The moving carriage is provided with the fit member with which the fitting member is fit, and the moving carriage has the moving carriage main body capable of supporting the vehicle support structure that supports the vehicle and moving on the moving path so as to be capable of supporting the vehicle at the predetermined position in the predetermined posture. The power supply secondary coil is provided at the vehicle support structure. The power supply apparatus is provided at the specific position that is at least one particular position on the moving path, and the power supply apparatus has the power supply primary coil capable of performing the wireless power transfer and the drive circuit that drives the power supply primary coil. The primary coil support member is provided at the specific position and provided with the fitting member that is fit with the fit member, and the primary coil support member supports the power supply primary coil.

The posture/position adjustment mechanism is provided at the specific position and capable of adjusting the relative posture or position between the primary coil support member and the moving carriage to change the posture between the releasing posture in which the fitting member releases the fit member and the fitting posture in which the fitting member is fit with the fit member. When the moving carriage stops at the specific position on the moving path, the posture/position adjustment mechanism adjusts the relative posture or position between the primary coil support member and the moving carriage such that the releasing posture is changed to the fitting posture, the power supply apparatus performs the wireless power transfer from the power supply primary coil to the power supply secondary coil in the fitting posture, and electric power supplied by the wireless power transfer is supplied to the vehicle.

As a result, the relative posture or position between the power supply primary coil and the power supply secondary coil is adjusted, and electric power can be efficiently supplied to the vehicle supported by the moving carriage that moves along the moving path.

In order to achieve the above-mentioned purpose, an aspect of the present disclosure is a vehicle power supply device that supplies electric power to a vehicle, the vehicle being provided with a power supply secondary coil, the vehicle power supply device including: a main structure provided with a storage space arranged along a moving path; a moving carriage provided with a first fit member with which a first fitting member is fit, and provided with a second fitting member that is fit with a second fit member, the moving carriage having a moving carriage main body capable of supporting the vehicle and moving on the moving path; a power supply apparatus provided at a specific position that is at least one particular position on the moving path, the power supply apparatus having a power supply primary coil capable of performing wireless power transfer and a drive circuit that drives the power supply primary coil; a primary coil support member provided with the first fitting member that is fit with the first fit member, the primary coil support member being configured to support the power supply primary coil; a secondary coil support member provided with the second fit member with which the second fitting member is fit, the secondary coil support member being configured to support the power supply secondary coil; a first posture/position adjustment mechanism capable of adjusting a relative posture or position between the primary coil support member and the moving carriage to change the posture between a first releasing posture in which the first fitting member releases the first fit member and a first fitting posture in which the first fitting member is fit with the first fit member; and a second posture/position adjustment mechanism capable of adjusting a relative posture or position between the moving carriage and the secondary coil support member to change the posture between a second releasing posture in which the second fitting member releases the second fit member and a second fitting posture in which the second fitting member is fit with the second fit member, wherein when the moving carriage stops at the specific position on the moving path, the first posture/position adjustment mechanism adjusts the relative posture or position between the primary coil support member and the moving carriage such that the first releasing posture is changed to the first fitting posture, the second posture/position adjustment mechanism adjusts the relative posture or position between the moving carriage and the secondary coil support member such that the second releasing posture is changed to the second fitting posture, and the power supply apparatus performs the wireless power transfer from the power supply primary coil to the power supply secondary coil in the first fitting posture and the second fitting posture.

Owing to the above-mentioned configuration, the power supply secondary coil is provided at the vehicle. The main structure is provided with the storage space arranged along the moving path. The moving carriage is provided with the first fit member with which the first fitting member is fit, and provided with the second fitting member that is fit with the second fit member. The moving carriage has the moving carriage main body capable of supporting the vehicle and moving on the moving path. The power supply apparatus is provided at the specific position that is at least one particular position on the moving path, and the power supply apparatus has the power supply primary coil capable of performing the wireless power transfer and the drive circuit that drives the power supply primary coil. The primary coil support member is provided with the first fitting member that is fit with the first fit member, and the primary coil support member supports the power supply primary coil. The secondary coil support member is provided with the second fit member with which the second fitting member is fit, and the secondary coil support member supports the power supply secondary coil. The first posture/position adjustment mechanism is capable of adjusting the relative posture or position between the primary coil support member and the moving carriage to change the posture between the first releasing posture in which the first fitting member releases the first fit member and the first fitting posture in which the first fitting member is fit with the first fit member. The second posture/position adjustment mechanism is capable of adjusting the relative posture or position between the moving carriage and the secondary coil support member to change the posture between the second releasing posture in which the second fitting member releases the second fit member and the second fitting posture in which the second fitting member is fit with the second fit member. When the moving carriage stops at the specific position on the moving path, the first posture/position adjustment mechanism adjusts the relative posture or position between the primary coil support member and the moving carriage such that the first releasing posture is changed to the first fitting posture, the second posture/position adjustment mechanism adjusts the relative posture or position between the moving carriage and the secondary coil support member such that the second releasing posture is changed to the second fitting posture, and the power supply apparatus performs the wireless power transfer from the power supply primary coil to the power supply secondary coil in the first fitting posture and the second fitting posture.

As a result, the relative posture or position between the power supply primary coil and the power supply secondary coil is adjusted, and electric power can be efficiently supplied to the vehicle supported by the moving carriage that moves along the moving path.

In order to achieve the above-mentioned purpose, an aspect of the present disclosure is a vehicle power supply device that supplies electric power to a vehicle, the vehicle power supply device including: a main structure provided with a storage space arranged along a moving path; a vehicle support structure that is a structure capable of supporting the vehicle; a moving carriage provided with a first fit member with which a first fitting member is fit, and provided with a second fitting member that is fit with a second fit member, the moving carriage having a moving carriage main body capable of supporting the vehicle support structure that supports the vehicle and moving on the moving path; a power supply secondary coil provided at the vehicle support structure; a power supply apparatus provided at a specific position that is at least one particular position on the moving path, the power supply apparatus having a power supply primary coil capable of performing wireless power transfer and a drive circuit that drives the power supply primary coil; a primary coil support member provided with the first fitting member that is fit with the first fit member, the primary coil support member being configured to support the power supply primary coil; a secondary coil support member provided at the vehicle support structure and provided with the second fit member with which the second fitting member is fit, the secondary coil support member being configured to support the power supply secondary coil; a first posture/position adjustment mechanism capable of adjusting a relative posture or position between the primary coil support member and the moving carriage to change the posture between a first releasing posture in which the first fitting member releases the first fit member and a first fitting posture in which the first fitting member is fit with the first fit member; and a second posture/position adjustment mechanism capable of adjusting a relative posture or position between the moving carriage and the secondary coil support member to change the posture between a second releasing posture in which the second fitting member releases the second fit member and a second fitting posture in which the second fitting member is fit with the second fit member, wherein when the moving carriage stops at the specific position on the moving path, the first posture/position adjustment mechanism adjusts the relative posture or position between the primary coil support member and the moving carriage such that the first releasing posture is changed to the first fitting posture, the second posture/position adjustment mechanism adjusts the relative posture or position between the moving carriage and the secondary coil support member such that the second releasing posture is changed to the second fitting posture, the power supply apparatus performs the wireless power transfer from the power supply primary coil to the power supply secondary coil in the first fitting posture and the second fitting posture, and electric power supplied by the wireless power transfer is supplied to the vehicle.

Owing to the above-mentioned configuration, the main structure is provided with the storage space arranged along the moving path. The vehicle support structure is the structure capable of supporting the vehicle. The moving carriage is provided with the first fit member with which the first fitting member is fit, and provided with the second fitting member that is fit with the second fit member. The moving carriage has the moving carriage main body capable of supporting the vehicle support structure that supports the vehicle and moving on the moving path. The power supply secondary coil is provided at the vehicle support structure. The power supply apparatus is provided at the specific position that is at least one particular position on the moving path, and the power supply apparatus has the power supply primary coil capable of performing the wireless power transfer and the drive circuit that drives the power supply primary coil. The primary coil support member is provided with the first fitting member that is fit with the first fit member, and the primary coil support member supports the power supply primary coil. The secondary coil support member is provided at the vehicle support structure and provided with the second fit member with which the second fitting member is fit, and the secondary coil support member supports the power supply secondary coil. The first posture/ position adjustment mechanism is capable of adjusting the relative posture or position between the primary coil support member and the moving carriage to change the posture between the first releasing posture in which the first fitting member releases the first fit member and the first fitting posture in which the first fitting member is fit with the first fit member. The second posture/position adjustment mechanism is capable of adjusting the relative posture or position between the moving carriage and the secondary coil support member to change the posture between the second releasing posture in which the second fitting member releases the second fit member and the second fitting posture in which the second fitting member is fit with the second fit member. When the moving carriage stops at the specific position on the moving path, the first posture/position adjustment mechanism adjusts the relative posture or position between the primary coil support member and the moving carriage such that the first releasing posture is changed to the first fitting posture, the second posture/position adjustment mechanism adjusts the relative posture or position between the moving carriage and the secondary coil support member such that the second releasing posture is changed to the second fitting posture, the power supply apparatus performs the wireless power transfer from the power supply primary coil to the power supply secondary coil in the first fitting posture and the second fitting posture, and electric power supplied by the wireless power transfer is supplied to the vehicle.

As a result, the relative posture or position between the power supply primary coil and the power supply secondary coil is adjusted, and electric power can be efficiently supplied to the vehicle supported by the moving carriage that moves along the moving path.

Effects of Disclosure

As described above, the wireless power transfer system according to an aspect of the present disclosure has the following effects owing to its configuration.

The relative posture or position between the primary coil support member and the secondary coil support member is adjusted so as to become the fitting posture in which the fitting member provided at the primary coil support member that supports the power supply primary coil is fit with the fit member provided at the secondary coil support member that supports the power supply secondary coil. The wireless power transfer is performed from the power supply primary coil to the power supply secondary coil in this posture. Therefore, the relative posture or position between the power supply primary coil and the power supply secondary coil is adjusted to suppress position displacement, and the wireless power transfer can be efficiently performed from the power supply primary coil to the power supply secondary coil.

The relative posture or position between the primary coil support member and the moving body is adjusted so as to become the fitting posture in which the fitting member provided at the primary coil support member that supports the power supply primary coil is fit with the fit member provided at the moving body that supports the power supply secondary coil at the predetermined position in the predetermined posture. The wireless power transfer is performed from the power supply primary coil to the power supply secondary coil in this posture. Therefore, the relative posture or position between the power supply primary coil and the power supply secondary coil is adjusted, and the wireless power transfer can be efficiently performed from the power supply primary coil to the power supply secondary coil.

The relative posture or position between the primary coil support member and the moving body is adjusted so as to become the first fitting posture in which the first fitting member provided at the primary coil support member that supports the power supply primary coil is fit with the first fit member provided at the moving body. The relative posture or position between the moving body and the secondary coil support member is adjusted so as to become the second fitting posture in which the second fitting member provided at the moving body is fit with the second fit member provided at the secondary coil support member that supports the power supply secondary coil. The wireless power transfer is performed from the power supply primary coil to the power supply secondary coil in this posture. Therefore, the relative posture or position between the power supply primary coil and the power supply secondary coil is adjusted, and the wireless power transfer can be efficiently performed from the power supply primary coil to the power supply secondary coil.

As described above, the vehicle power supply device according to an aspect of the present disclosure has the following effects owing to its configuration.

When the moving carriage stops at the specific position on the moving path, the relative posture or position between the primary coil support member and the secondary coil support member is adjusted so as to become the fitting posture in which the fitting member provided at the primary coil support member that supports the power supply primary coil provided at the specific position is fit with the fit member provided at the secondary coil support member that supports the power supply secondary coil provided at the vehicle. The wireless power transfer is performed from the power supply primary coil to the power supply secondary coil in this posture. Therefore, the relative posture or position between the power supply primary coil and the power supply secondary coil is adjusted to suppress position displacement, and electric power can be efficiently supplied to the vehicle supported by the moving carriage that moves along the moving path.

When the moving carriage stops at the specific position on the moving path, the relative posture or position between the primary coil support member and the secondary coil support member is adjusted so as to become the fitting posture in which the fitting member provided at the primary coil support member that supports the power supply primary coil provided at the specific position is fit with the fit member provided at the secondary coil support member that supports the power supply secondary coil provided at the vehicle support structure. The wireless power transfer is performed from the power supply primary coil to the power supply secondary coil in this posture, and electric power supplied by the wireless power transfer is supplied to the vehicle. Therefore, the relative posture or position between the power supply primary coil and the power supply secondary coil is adjusted, and electric power can be efficiently supplied to the vehicle supported by the moving carriage that moves along the moving path.

When the moving carriage stops at the specific position on the moving path, the relative posture or position between the primary coil support member and the moving carriage is adjusted so as to become the fitting posture in which the fitting member provided at the primary coil support member that supports the power supply primary coil provided at the specific position is fit with the fit member provided at the moving carriage that supports the vehicle. The wireless power transfer is performed from the power supply primary coil to the power supply secondary coil in this posture. Therefore, the relative posture or position between the power supply primary coil and the power supply secondary coil is adjusted, and electric power can be efficiently supplied to the vehicle supported by the moving carriage that moves along the moving path.

When the moving carriage stops at the specific position on the moving path, the relative posture or position between the primary coil support member and the vehicle is adjusted so as to become the fitting posture in which the fitting member provided at the primary coil support member that supports the power supply primary coil provided at the specific position is fit with the fit member provided at the vehicle support structure that supports the power supply secondary coil. The wireless power transfer is performed from the power supply primary coil to the power supply secondary coil in this posture, and electric power supplied by the wireless power transfer is supplied to the vehicle. Therefore, the relative posture or position between the power supply primary coil and the power supply secondary coil is adjusted, and electric power can be efficiently supplied to the vehicle supported by the moving carriage that moves along the moving path.

When the moving carriage stops at the specific position on the moving path, the relative posture or position between the primary coil support member and the moving carriage is adjusted so as to become the first fitting posture in which the first fitting member provided at the primary coil support member that supports the power supply primary coil provided at the specific position is fit with the second fit member provided at the moving carriage that supports the vehicle. The relative posture or position between the moving carriage and the secondary coil support member is adjusted so as to become the second fitting posture in which the second fitting member provided at the moving carriage is fit with the second fit member provided at the secondary coil support member that supports the power supply secondary coil provided at the vehicle. The wireless power transfer is performed from the power supply primary coil to the power supply secondary coil in this posture. Therefore, the relative posture or position between the power supply primary coil and the power supply secondary coil is adjusted, and electric power can be efficiently supplied to the vehicle supported by the moving carriage that moves along the moving path.

When the moving carriage stops at the specific position on the moving path, the relative posture or position between the primary coil support member and the vehicle is adjusted so as to become the fitting posture in which the first fitting member provided at the primary coil support member that supports the power supply primary coil provided at the specific position is fit with the first fit member provided at the vehicle support structure that supports the power supply secondary coil. The relative posture or position between the moving carriage and the secondary coil support member is adjusted so as to become the second fitting posture in which the second fitting member provided at the moving carriage is fit with the second fit member provided at the secondary coil support member that supports the power supply secondary coil provided at the vehicle support structure. The wireless power transfer is performed from the power supply primary coil to the power supply secondary coil in this posture, and electric power supplied by the wireless power transfer is supplied to the vehicle. Therefore, the relative posture or position between the power supply primary coil and the power supply secondary coil is adjusted, and electric power can be efficiently supplied to the vehicle supported by the moving carriage that moves along the moving path.

Thus, it is possible to provide the wireless power transfer system and the vehicle power supply device capable of supplying electric power efficiently while suppressing the position displacement.

DESCRIPTION OF EMBODIMENTS

Hereinafter, embodiments for practicing the present disclosure will be described with reference to the drawings.

To begin with, a wireless power transfer system according to an embodiment of the present disclosure will be described based on the drawings.

First, wireless power transfer systems 100 according to first to second embodiments of the present disclosure will be described based on the drawings.

Figure 1:
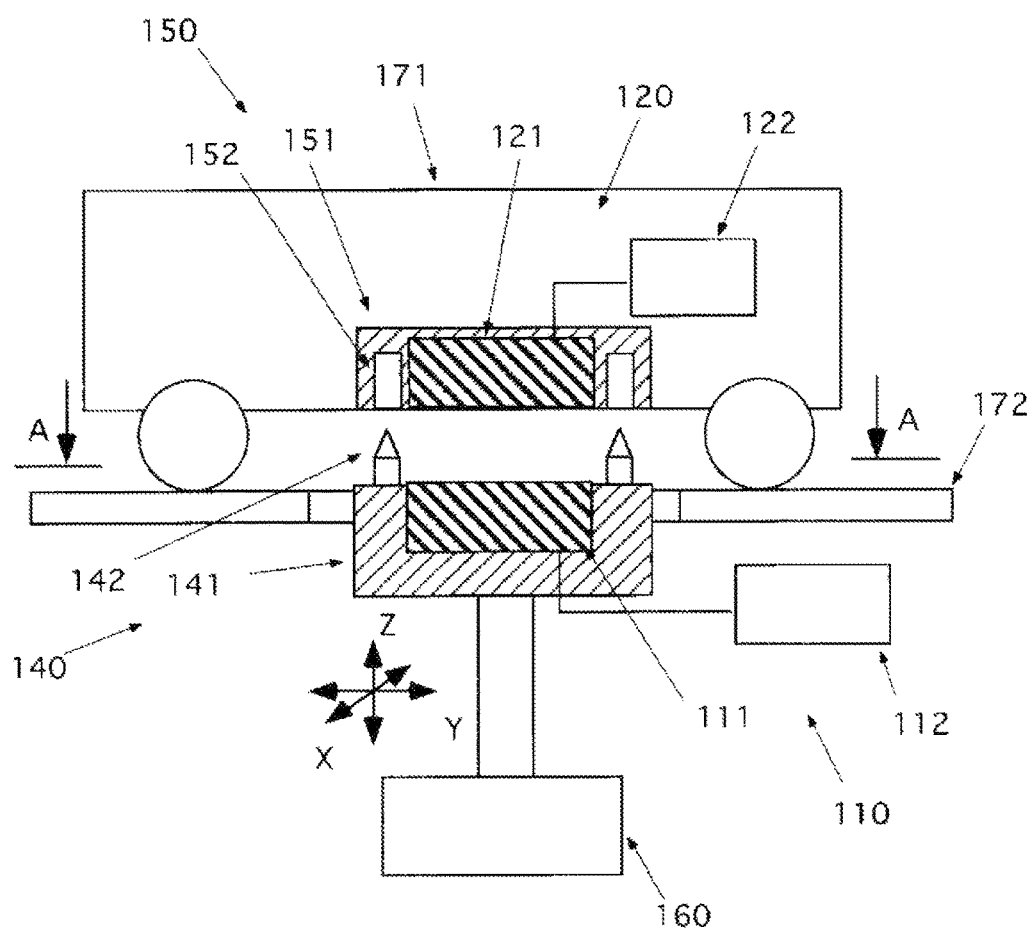
FIG. 1 is a conceptual diagram of a wireless power transfer system according to a first embodiment of the present disclosure.
Figure 2:
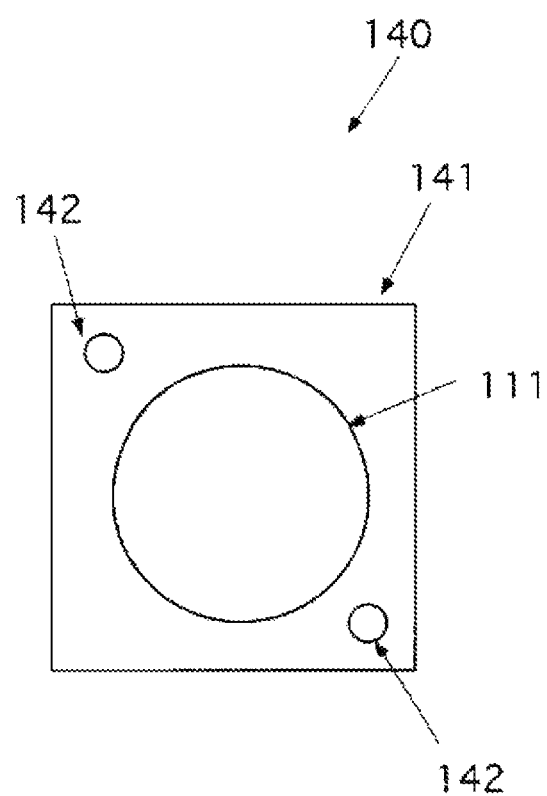
FIG. 2 is a cross-sectional diagram taken along line A-A of the wireless power transfer system according to the first embodiment of the present disclosure.
Figure 3:
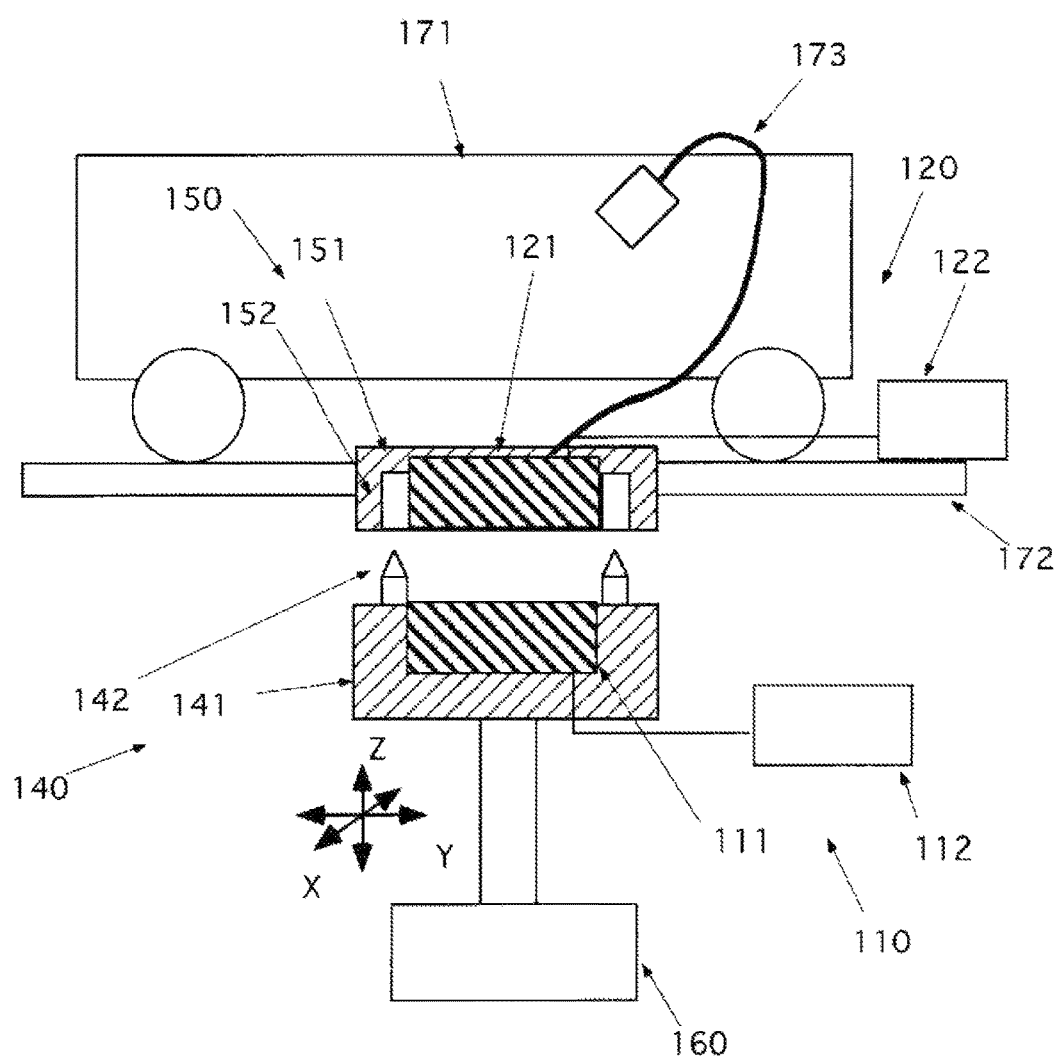
FIG. 3 is a conceptual diagram of a wireless power transfer system according to a second embodiment of the present disclosure.

FIG. 1 is a conceptual diagram of the wireless power transfer system according to the first embodiment of the present disclosure. FIG. 2 is a diagram viewed from arrows A-A of the wireless power transfer system according to the first embodiment of the present disclosure. FIG. 3 is a conceptual diagram of the wireless power transfer system according to the second embodiment of the present disclosure.

The wireless power transfer systems 100 according to the first to second embodiments of the present disclosure each include a power supply apparatus 110, a power receiving apparatus 120, a primary coil support member 140, a secondary coil support member 150, and a posture/position adjustment mechanism 160.

The power supply apparatus 110 includes a power supply primary coil 111, a drive circuit 112, and an adjustment circuit (not illustrated).

The power supply primary coil 111 is a transmission side coil circuit for enabling wireless power transfer.

The drive circuit 112 is an electric circuit that drives the power supply primary coil 111.

For example, the drive circuit 112 supplies AC electric power having a predetermined frequency of the power supply primary coil.

The adjustment circuit (not illustrated) is a circuit that adjusts electric and magnetic properties of the power supply apparatus 110.

For example, the adjustment circuit (not illustrated) adjusts an electromagnetic resonance frequency of the power supply apparatus 110.

The power receiving apparatus 120 includes a power supply secondary coil 121 and a load 122.

The power receiving apparatus 120 may include the power supply secondary coil 121, the load 122, and an adjustment circuit (not illustrated).

The power supply secondary coil 121 is a reception side coil circuit for enabling the wireless power transfer.

The adjustment circuit (not illustrated) is a circuit that adjusts electric and magnetic properties of the power receiving apparatus 120.

For example, the adjustment circuit (not illustrated) adjusts an electromagnetic resonance frequency of the power receiving apparatus 120.

Electric power supplied in a wireless manner from the power supply primary coil 111 can be supplied to the power supply secondary coil 121.

When an electric current flows in the power supply primary coil 111, a magnetic field is generated in a space sandwiched between the power supply primary coil 111 and the power supply secondary coil 121, and the generated magnetic field causes an electric current of the power supply primary coil 111 to flow.

The primary coil support member 140 is such a member as to be provided with a fitting member 142 that is fit with a fit member 152, and support the power supply primary coil 111.

The primary coil support member 140 may include a primary coil support member main body 141 and the fitting member 142.

The primary coil support member main body 141 supports the power supply primary coil 111.

The fitting member 142 is fixed to the primary coil support member main body 141.

The secondary coil support member 150 is such a member as to be provided with the fit member 152 with which the fitting member 142 is fit, and support the power supply secondary coil 121.

The secondary coil support member 150 may include a secondary coil support member main body 151 and the fit member 152.

The secondary coil support member main body 151 supports the power supply secondary coil 121.

The fit member 152 is fixed to the secondary coil support member main body 151.

For example, the secondary coil support member 150 is incorporated in an object 171.

The object 171 is an object to which electric power is supplied.

For example, the object is a vehicle.

In FIG. 1, it is illustrated that the secondary coil support member 150 is incorporated in the object 171.

The present disclosure is not limited to the secondary coil support member 150 incorporated in the object 171. For example, the secondary coil support member 150 may be incorporated in an object support structure 172 that supports the object.

For example, the object support structure 172 is a pallet that is used in a mechanical parking device.

In FIG. 3, it is illustrated that the secondary coil support member 150 is incorporated in the object support structure 172 that supports the object.

In FIG. 3, it is illustrated that electric power is supplied from the power receiving apparatus 120 to the object 171 via a charging cable 173.

For example, the fitting member 142 is a rod-shaped member having a tip pointed in a tapered shape.

For example, in the fit member 152, a cavity having a diameter slightly larger than a diameter of a root part of the rod-shaped member is formed.

The fitting member 142 enters the cavity of the fit member 152 from the tip part, and the root part is fit with the cavity.

The posture/position adjustment mechanism 160 is a mechanism capable of adjusting a relative posture or position between the primary coil support member 140 and the secondary coil support member 150 to change the posture between a releasing posture and a fitting posture.

The releasing posture is such a posture that the fitting member 142 releases the fit member 152.

The fitting posture is such a posture that the fitting member 142 is fit with the fit member 152.

When the posture is the fitting posture, the wireless power transfer is efficiently performed from the power supply apparatus 110 to the power receiving apparatus 120.

The posture/position adjustment mechanism 160 may be a mechanism supported by a foundation and capable of adjusting a posture or position of the primary coil support member 140 to change the posture between the releasing posture and the fitting posture. The releasing posture is such a posture that the fitting member 142 releases the fit member 152, and the fitting posture is such a posture that the fitting member 142 is fit with the fit member 152.

For example, the posture/position adjustment mechanism 160 is supported by the foundation and capable of adjusting the posture or position of the primary coil support member 140 to change the posture between the releasing posture and the fitting posture.

The posture/position adjustment mechanism 160 adjusts the relative posture or position between the primary coil support member and the secondary coil support member such that the releasing posture is changed to the fitting posture, and the wireless power transfer is performed from the power supply primary coil to the power supply secondary coil in the fitting posture.

The posture/position adjustment mechanism 160 may adjust the relative posture or position between the primary coil support member and the secondary coil support member such that reaction force that acts on the fitting member when the releasing posture is changed to the fitting posture falls below a predetermined value, and the wireless power transfer may be performed from the power supply primary coil to the power supply secondary coil in the fitting posture.

Next, wireless power transfer systems 100 according to third to fourth embodiments of the present disclosure will be described based on the drawings.

Figure 4:
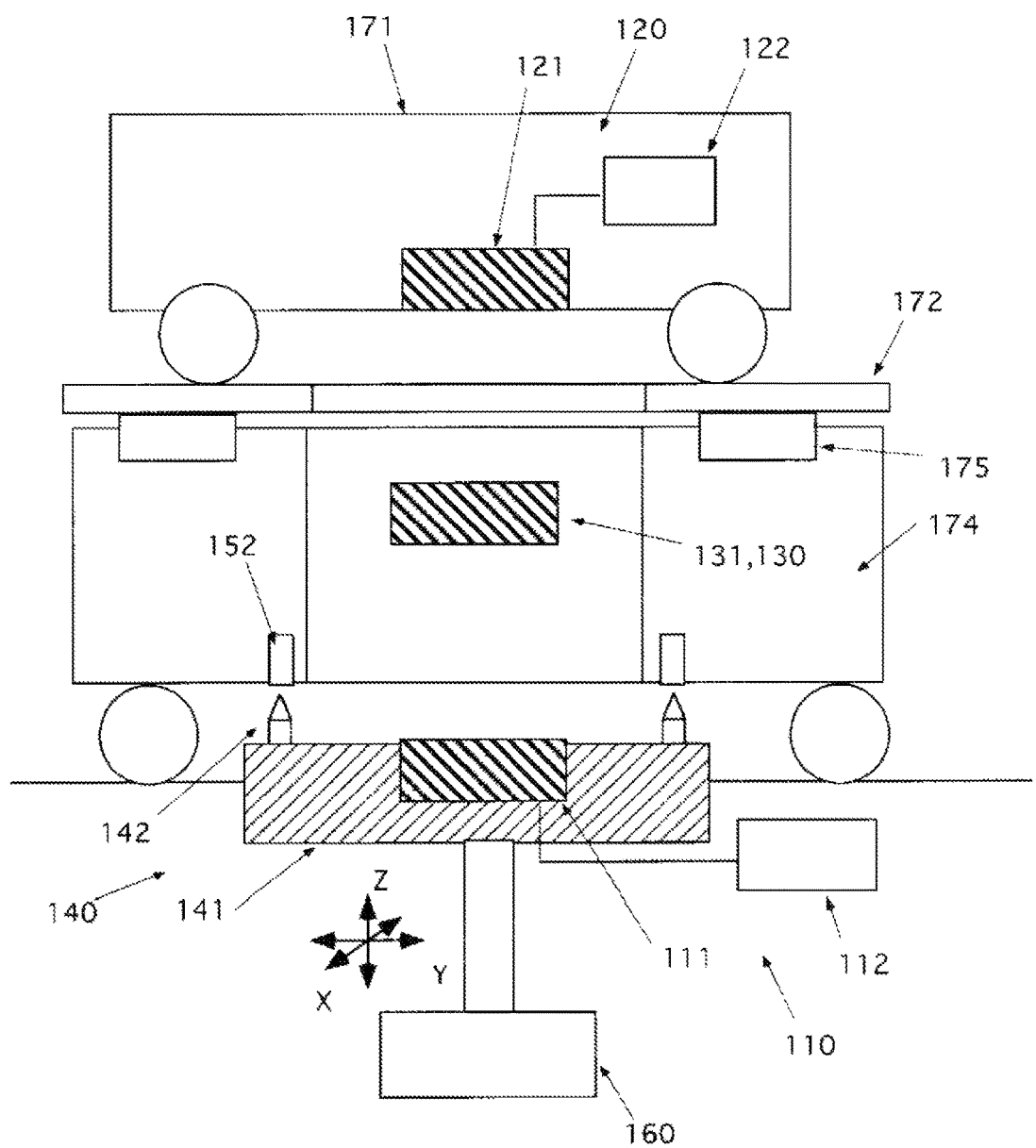
FIG. 4 is a conceptual diagram of a wireless power transfer system according to a third embodiment of the present disclosure.
Figure 5:
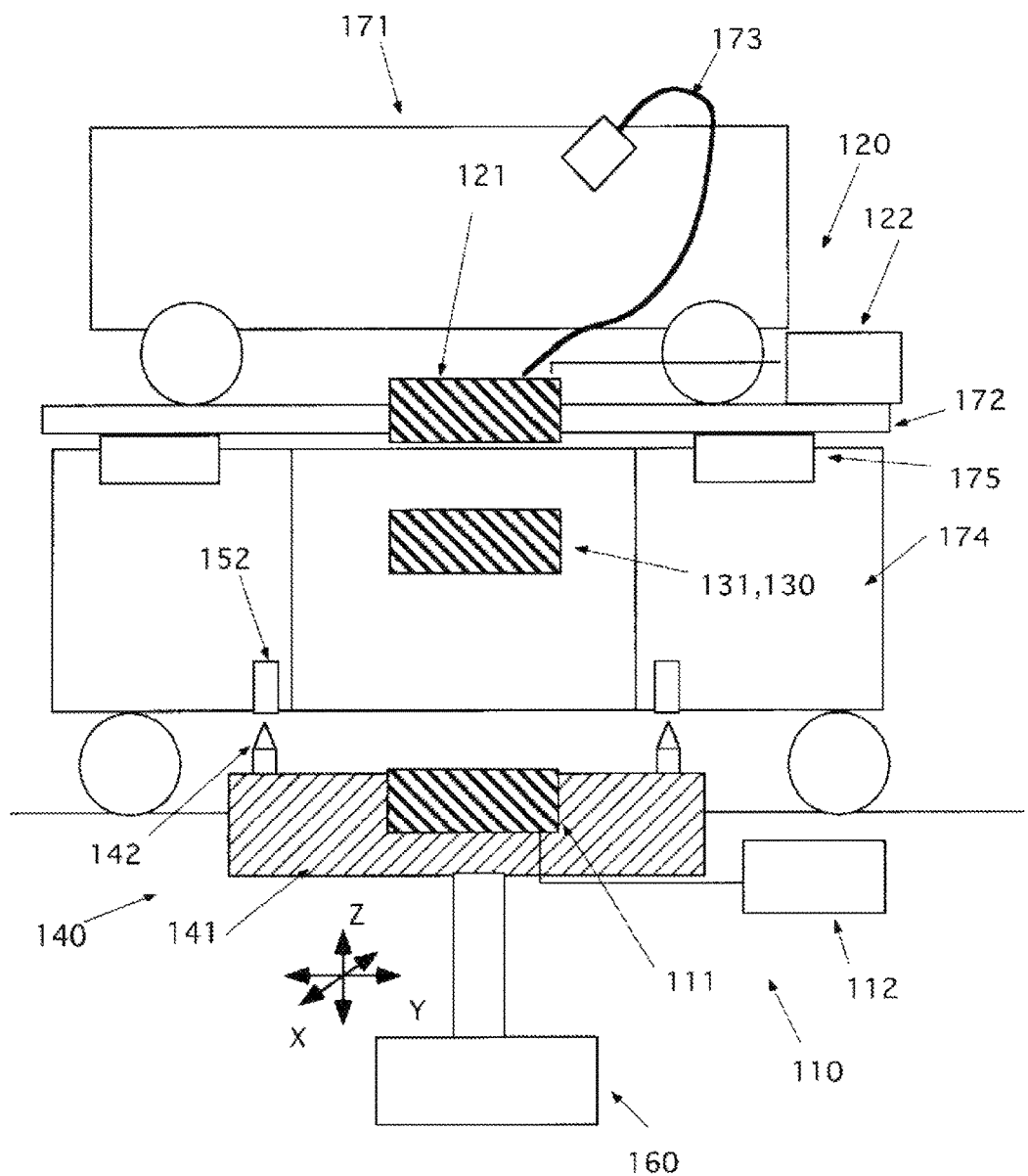
FIG. 5 is a conceptual diagram of a wireless power transfer system according to a fourth embodiment of the present disclosure.

FIG. 4 is a conceptual diagram of the wireless power transfer system according to the third embodiment of the present disclosure. FIG. 5 is a conceptual diagram of the wireless power transfer system according to the fourth embodiment of the present disclosure.

The wireless power transfer systems 100 according to the third to fourth embodiments of the present disclosure each include a power supply apparatus 110, a power receiving apparatus 120, a primary coil support member 140, a moving body 174, and a posture/position adjustment mechanism 160.

The wireless power transfer systems 100 according to the third to fourth embodiments of the present disclosure each may include the power supply apparatus 110, the power receiving apparatus 120, a relay apparatus 130, the primary coil support member 140, the moving body 174, and the posture/position adjustment mechanism 160.

Since the configurations of the power supply apparatus 110 and the power receiving apparatus 120 are the same as those of the wireless power transfer systems 100 according to the first to second embodiments, the description will be omitted.

The relay apparatus 130 is an apparatus that relays wireless power transfer from the power supply apparatus 110 to the power receiving apparatus 120.

The relay apparatus 130 includes at least one relay coil 131.

The relay apparatus 130 may include at least one relay coil 131 and an adjustment circuit (not illustrated).

The relay coil 131 is a coil circuit that is electrically independent of the power supply primary coil 111 and the power supply secondary coil 121.

For example, the relay coil 131 is a coil circuit including an electric circuit that is not electrically connected to the power supply primary coil and the power supply secondary coil.

The adjustment circuit (not illustrated) is a circuit that adjusts electric and magnetic properties of the relay apparatus 130.

For example, the adjustment circuit (not illustrated) adjusts an electromagnetic resonance frequency of the relay apparatus 130.

Electric power supplied in a wireless manner from the power supply primary coil 111 can be supplied to the power supply secondary coil 121.

Electric power supplied in a wireless manner from the power supply primary coil 111 can be supplied to the power supply secondary coil 121 via the relay apparatus 130.

The primary coil support member 140 is such a member as to be provided with a fitting member 142 that is fit with a fit member 152, and support the power supply primary coil 111.

The primary coil support member 140 may include a primary coil support member main body 141 and the fitting member 142.

The primary coil support member main body 141 supports the power supply primary coil 111.

The fitting member 142 is fixed to the primary coil support member main body 141.

For example, the power supply secondary coil 121 is incorporated in an object 171.

The object is an object to which electric power is supplied.

In FIG. 4, it is illustrated that the power supply secondary coil 121 is incorporated in the object 171.

For example, the power supply secondary coil 121 is incorporated in an object support structure 172 that supports the object.

In FIG. 5, it is illustrated that the power supply secondary coil 121 is incorporated in the object support structure 172.

The moving body 174 is provided with the fit member 152 with which the fitting member 142 is fit, and the moving body is capable of supporting the power supply secondary coil 121 at a predetermined position in a predetermined posture.

The moving body 174 may be able to support the object support structure 172 that supports the object 171 and move.

The posture/position adjustment mechanism 160 is a mechanism capable of adjusting a relative posture or position between the primary coil support member 140 and the moving body 174 to change the posture between a releasing posture and a fitting posture.

The releasing posture is such a posture that the fitting member 142 releases the fit member 152.

The fitting posture is such a posture that the fitting member 142 is fit with the fit member 152.

For example, the posture/position adjustment mechanism 160 is supported by a foundation and capable of adjusting a posture or position of the primary coil support member 140 to change the posture between the releasing posture and the fitting posture.

When the moving body 174 supports the power supply secondary coil 121 at the predetermined position in the predetermined posture and is located between the power supply primary coil 111 and the power supply secondary coil 121, the posture/position adjustment mechanism 160 adjusts the relative posture or position between the primary coil support member 140 and the moving body 174 such that the releasing posture is changed to the fitting posture, and the wireless power transfer is performed from the power supply primary coil 111 to the power supply secondary coil 121 in the fitting posture.

When the moving body 174 supports the power supply secondary coil 121 at the predetermined position in the predetermined posture and is located between the power supply primary coil 111 and the power supply secondary coil 121, the posture/position adjustment mechanism may adjust the relative posture or position between the primary coil support member 140 and the moving body 174 such that reaction force that acts on the fitting member when the releasing posture is changed to the fitting posture falls below a predetermined value, and the wireless power transfer may be performed from the power supply primary coil 111 to the power supply secondary coil 121 in the fitting posture.

Next, wireless power transfer systems 100 according to fifth to sixth embodiments of the present disclosure will be described based on the drawings.

Figure 6:
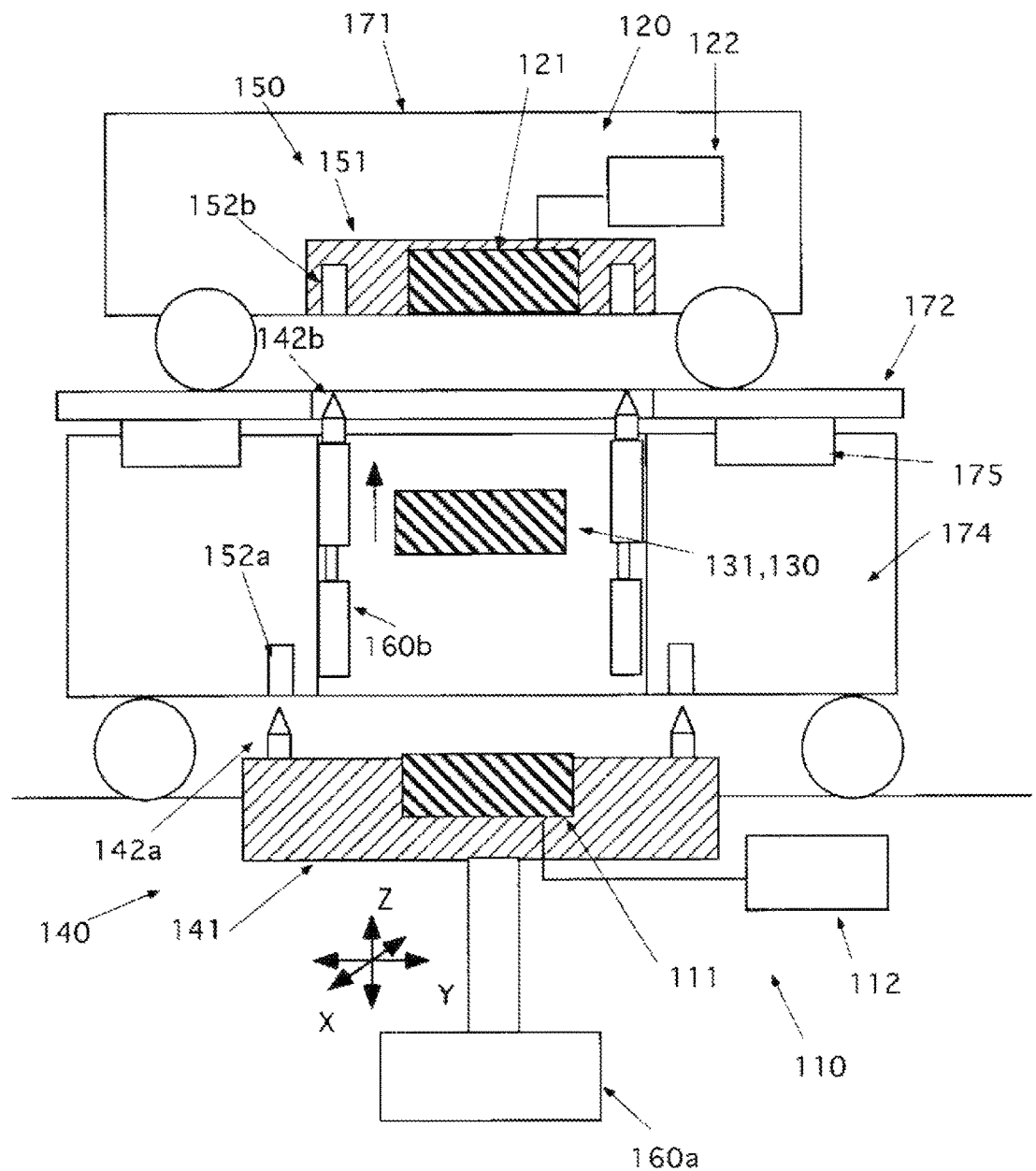
FIG. 6 is a conceptual diagram of a wireless power transfer system according to a fifth embodiment of the present disclosure.
Figure 7:
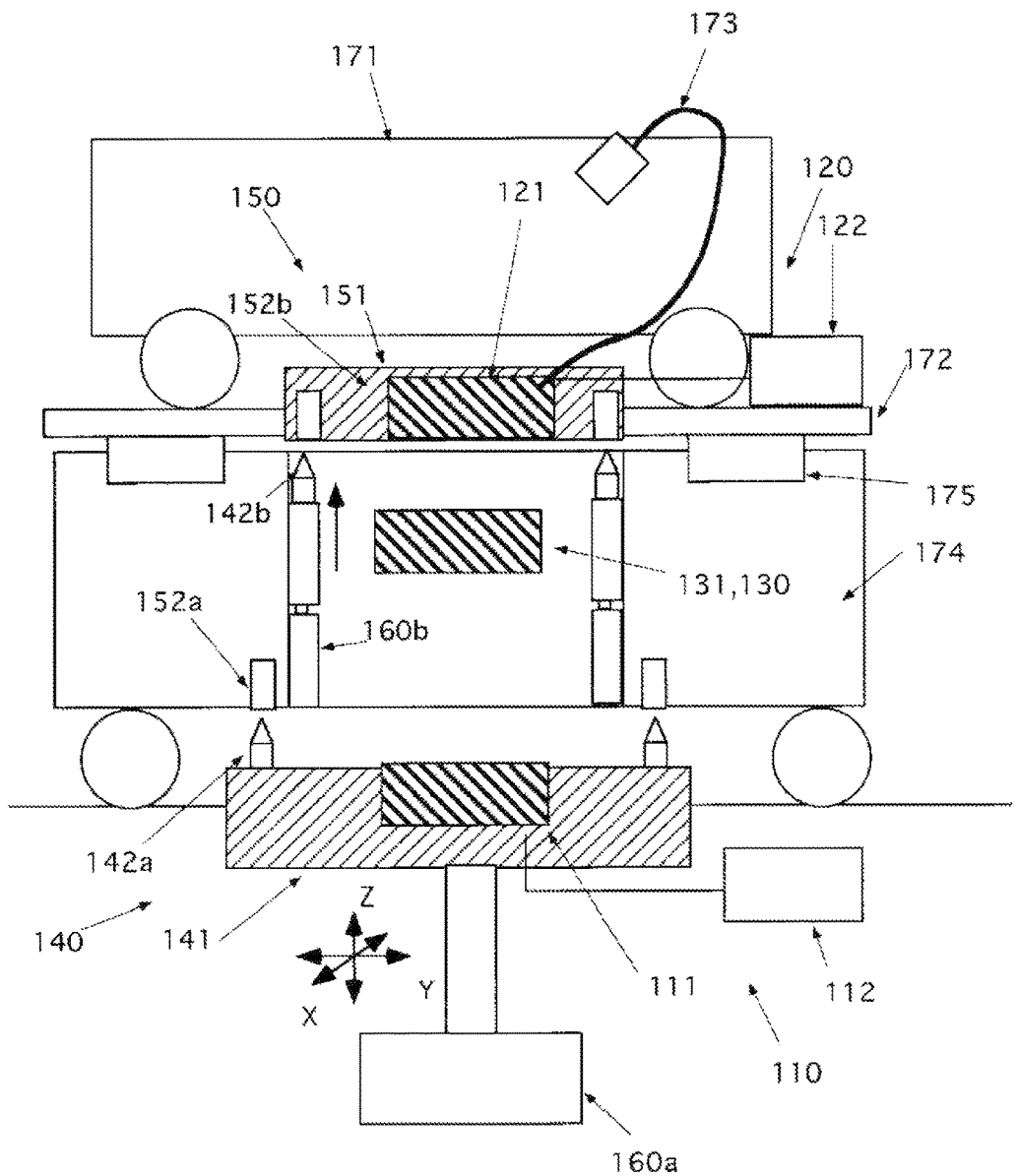
FIG. 7 is a conceptual diagram of a wireless power transfer system according to a sixth embodiment of the present disclosure.

FIG. 6 is a conceptual diagram of the wireless power transfer system according to the fifth embodiment of the present disclosure. FIG. 7 is a conceptual diagram of the wireless power transfer system according to the sixth embodiment of the present disclosure.

The wireless power transfer system 100 according to the fifth to sixth embodiments of the present disclosure includes a power supply apparatus 110, a power receiving apparatus 120, a primary coil support member 140, a moving body 174, a first posture/position adjustment mechanism 160a, and a second posture/position adjustment mechanism 160b.

The wireless power transfer system 100 according to the third embodiment of the present disclosure may include the power supply apparatus 110, the power receiving apparatus 120, a relay apparatus 130, the primary coil support member 140, the moving body 174, the first posture/position adjustment mechanism 160a, and the second posture/position adjustment mechanism 160b.

Since the configurations of the power supply apparatus 110, the power receiving apparatus 120, and the relay apparatus 130 are the same as those of the wireless power transfer system 100 according to the third embodiment, the description will be omitted.

Electric power supplied in a wireless manner from the power supply primary coil 111 can be supplied to the power supply secondary coil 121.

Electric power supplied in a wireless manner from the power supply primary coil 111 can be supplied to the power supply secondary coil 121 via the relay apparatus 130.

The primary coil support member 140 is such a member as to be provided with a first fitting member 142a that is fit with a first fit member 152a, and support the power supply primary coil 111.

The primary coil support member 140 may include a primary coil support member main body 141 and a fitting member 142.

The primary coil support member main body 141 supports the power supply primary coil 111.

The first fitting member 142a is fixed to the primary coil support member main body 141.

The secondary coil support member 150 is such a member as to be provided with a second fit member 152b with which a second fitting member 142b is fit, and support the power supply secondary coil 121.

The secondary coil support member 150 may include a secondary coil support member main body 151 and a fit member 152.

The secondary coil support member main body 151 supports the power supply secondary coil 121.

The second fit member 152b is fixed to the secondary coil support member main body 151.

For example, the secondary coil support member 150 is incorporated in an object 171.

The object 171 is an object to which electric power is supplied.

In FIG. 6, it is illustrated that the secondary coil support member 150 is incorporated in the object 171.

For example, the secondary coil support member 150 is incorporated in an object support structure 172 that supports the object.

In FIG. 7, it is illustrated that the secondary coil support member 150 is incorporated in the object support structure 172 that supports the object.

In FIG. 7, it is illustrated that electric power is supplied from the power receiving apparatus 120 to the object 171 via a charging cable 173.

The moving body 174 is provided with the first fit member 152a with which the first fitting member 142a is fit, and provided with the second fitting member 142b that is fit with the second fit member 152b.

The moving body 174 may be able to support the object support structure 172 that supports the object 171 and move.

The first fit member 152a is fixed to the moving body.

The second fitting member 142b is fixed to the moving body 174.

The second fitting member 142b may be fixed to the moving body 174 so as to freely move in a vertical direction.

For example, the first fitting member 142a is a rod-shaped member having a tip pointed in a tapered shape.

For example, in the first fit member 152a, a cavity having a diameter slightly larger than a diameter of a root part of the rod-shaped member is formed.

The first fitting member 142a enters the cavity of the first fit member 152a from the tip part, and the root part is fit with the cavity.

For example, the second fitting member 142b is a rod-shaped member having a tip pointed in a tapered shape.

For example, in the second fit member 152b, a cavity having a diameter slightly larger than a diameter of a root part of the rod-shaped member is formed.

The second fitting member 142b enters the cavity of the second fit member 152b from the tip part, and the root part is fit with the cavity.

The first posture/position adjustment mechanism 160a is a posture/position adjustment mechanism capable of adjusting a relative posture or position between the primary coil support member 140 and the moving body 174 to change the posture between a first releasing posture and a first fitting posture.

The first releasing posture is such a posture that the first fitting member 142a releases the first fit member 152a.

The first fitting posture is such a posture that the first fitting member 142a is fit with the first fit member 152a.

The second posture/position adjustment mechanism 160b is a posture/position adjustment mechanism capable of adjusting a relative posture or position between the moving body 174 and the secondary coil support member 150 to change the posture between a second releasing posture and a second fitting posture.

The second releasing posture is such a posture that the second fitting member 142b releases the second fit member 152b.

The second fitting posture is such a posture that the second fitting member 142b is fit with the second fit member 152b.

When the moving body 174 is located between the power supply primary coil 111 and the power supply secondary coil 121, the first posture/position adjustment mechanism 160a adjusts the relative posture or position between the primary coil support member 140 and the moving body 174 such that the first releasing posture is changed to the first fitting posture, the second posture/position adjustment mechanism 160b adjusts the relative posture or position between the moving body 174 and the secondary coil support member 150 such that the second releasing posture is changed to the second fitting posture, and the wireless power transfer is performed from the power supply primary coil 111 to the power supply secondary coil 121 in the first fitting posture and the second fitting posture.

When the moving body 174 is located between the power supply primary coil 111 and the power supply secondary coil 121, the first posture/position adjustment mechanism 160a may adjust the relative posture or position between the primary coil support member 140 and the moving body 174 such that reaction force that acts on the first fitting member when the first releasing posture is changed to the first fitting posture falls below a predetermined value, the second posture/position adjustment mechanism 160b may adjust the relative posture or position between the moving body 174 and the secondary coil support member 150 such that reaction force that acts on the second fitting member 142b when the second releasing posture is changed to the second fitting posture falls below a predetermined value, and the wireless power transfer may be performed from the power supply primary coil 111 to the power supply secondary coil 121, with the first fitting member 142a fit with the first fit member 152a and the second fitting member 142b fit with the second fit member 152b.

Hereinafter, a vehicle power supply device according to an embodiment of the present disclosure will be described.

First, a vehicle power supply device according to the first embodiment of the present disclosure will be described based on the drawings.

Figure 8:
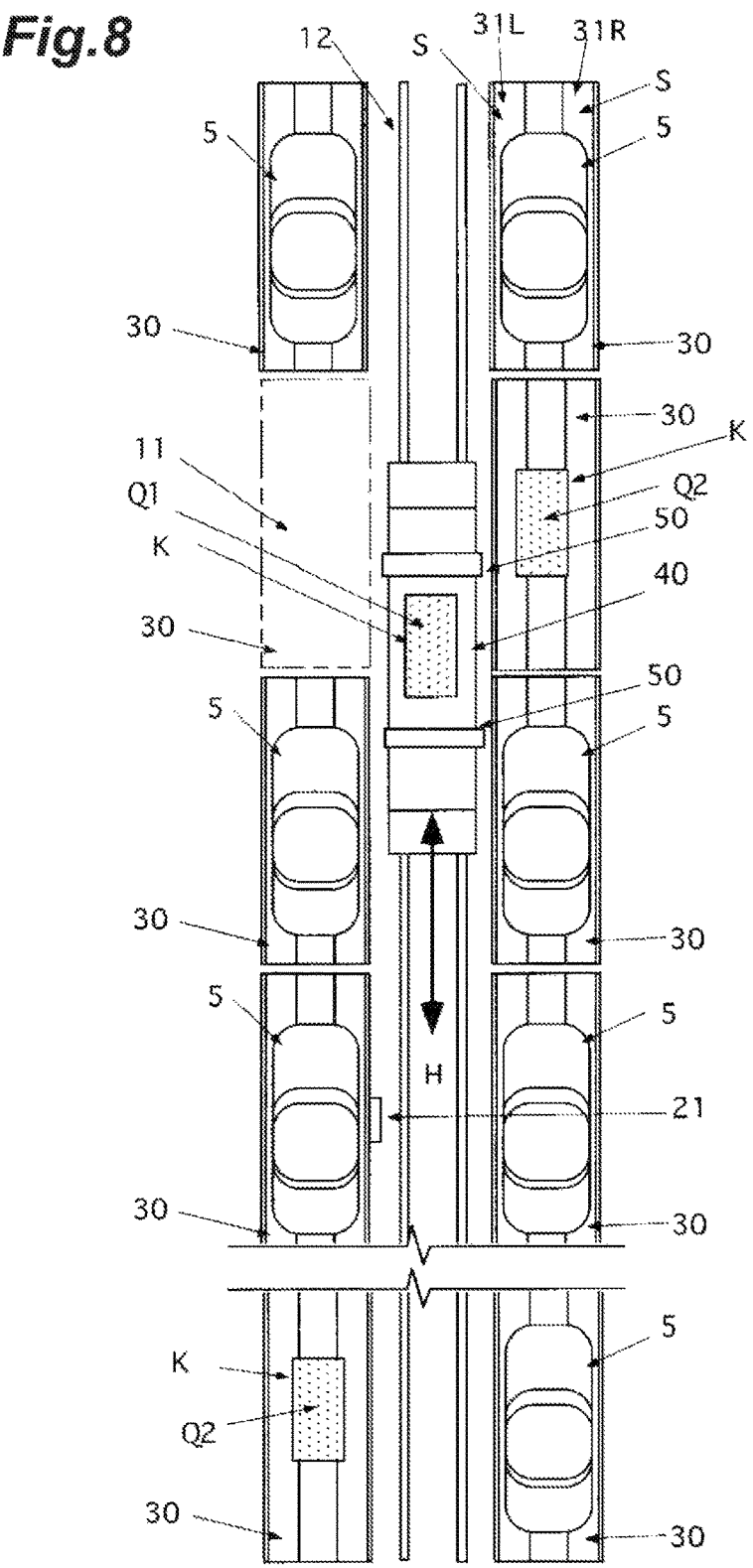
FIG. 8 is a plan view of a parking device to which a vehicle power supply device according to the first embodiment of the present disclosure is applied.
Figure 9:
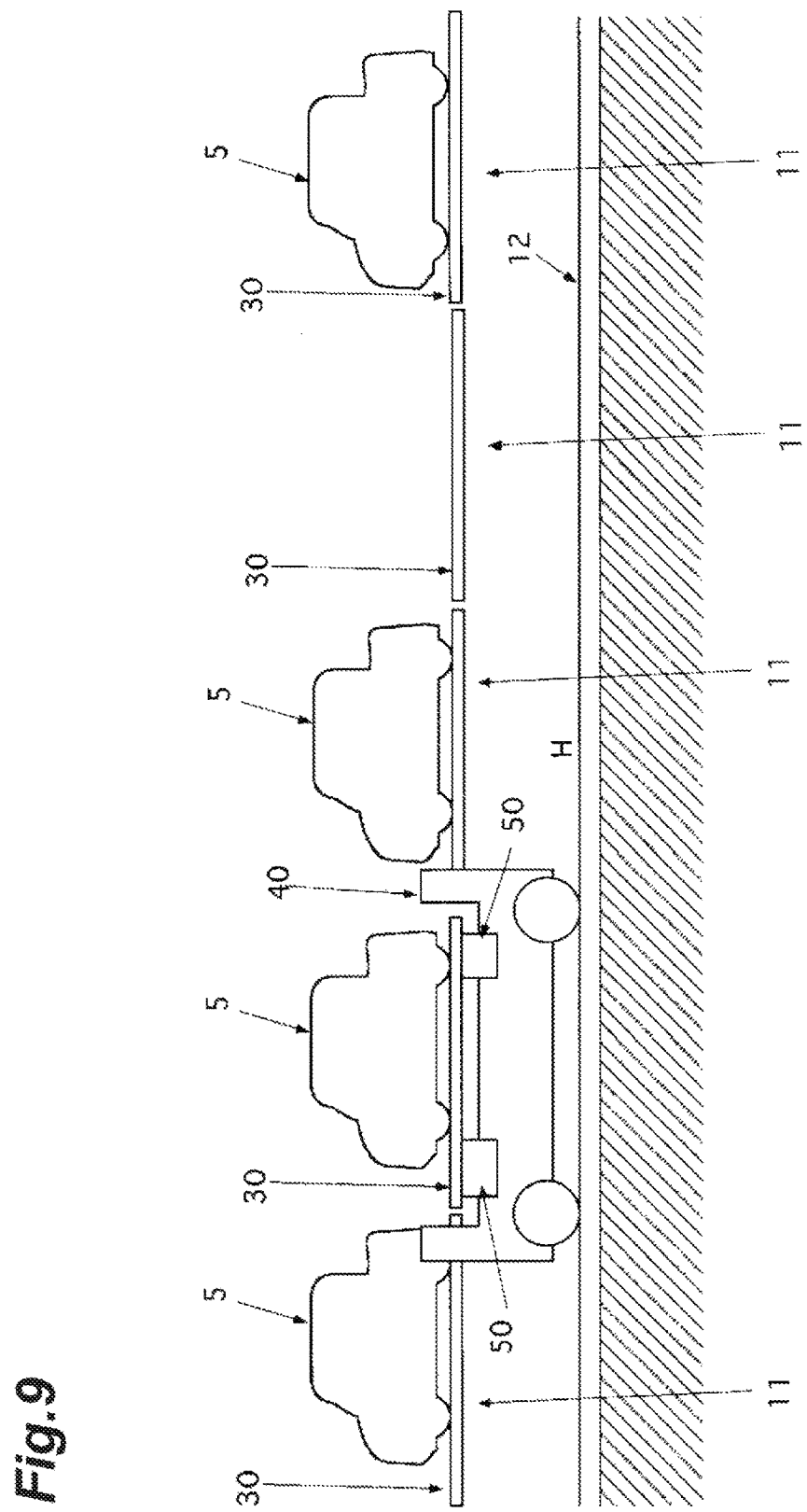
FIG. 9 is a side view of the parking device to which the vehicle power supply device according to the first embodiment of the present disclosure is applied.
Figure 10:
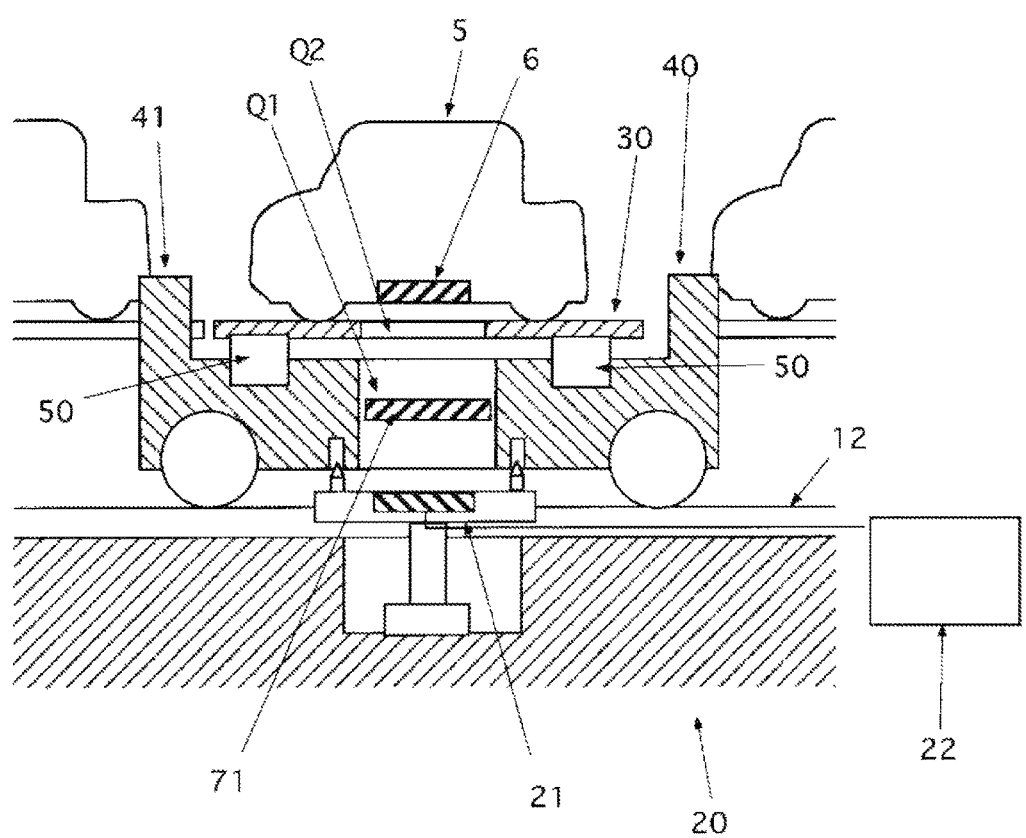
FIG. 10 is a side cross-sectional view of the vehicle power supply device according to the first embodiment of the present disclosure.

FIG. 8 is a plan view of a parking device to which the vehicle power supply device according to the first embodiment of the present disclosure is applied. FIG. 9 is a side view of the parking device to which the vehicle power supply device according to the first embodiment of the present disclosure is applied. FIG. 10 is a side cross-sectional view of the vehicle power supply device according to the first embodiment of the present disclosure.

The vehicle power supply device according to the first embodiment is configured in such a manner that the present disclosure is applied to a so-called plane reciprocation parking device or an elevator sliding parking device.

The vehicle power supply device according to the first embodiment of the present disclosure is a device that supplies electric power to a vehicle capable of receiving power supply.

The vehicle power supply device according to the first embodiment of the present disclosure includes a main structure (not illustrated), a wireless power transfer system 20, a vehicle support structure 30, and a moving carriage 40.

The vehicle power supply device according to the first embodiment of the present disclosure may include the main structure (not illustrated), the wireless power transfer system 20, the vehicle support structure 30, the moving carriage 40, and a relay apparatus 70.

The vehicle power supply device according to the first embodiment of the present disclosure may include the main structure (not illustrated), the wireless power transfer system 20, the vehicle support structure 30, the moving carriage 40, a transfer apparatus 50, and the relay apparatus 70.

A vehicle 5 is a moving body capable of receiving power supply.

The vehicle 5 may be provided, on a lower surface thereof, with a power supply secondary coil 6 capable of receiving wireless power transfer.

For example, the vehicle 5 is a car having the power supply secondary coil 6 for the wireless power transfer on a bottom part thereof.

To the power supply secondary coil 6, electric power is supplied in a wireless manner from a power supply primary coil 21 placed below the power supply secondary coil 6.

To the power supply secondary coil 6, for example, electric power is supplied in a wireless manner using a magnetic field resonance type from the power supply primary coil 21 placed below the power supply secondary coil 6.

To the power supply secondary coil 6, for example, electric power is supplied in a wireless manner using an electric field resonance type from the power supply primary coil 21 placed below the power supply secondary coil 6.

To the power supply secondary coil 6, for example, electric power is supplied in a wireless manner using an electromagnetic induction type from the power supply primary coil 21 placed below the power supply secondary coil 6.

The main structure (not illustrated) is a principal structure of the vehicle power supply device.

For example, the main structure (not illustrated) is a foundation structure of the vehicle power supply device.

The main structure (not illustrated) is provided with a storage space 11 arranged along a moving path H.

The main structure (not illustrated) may be provided with a plurality of storage spaces 11.

For example, the main structure (not illustrated) includes the plurality of storage spaces 11 and a moving rail 12.

The moving carriage which will be described later runs on the moving rail 12 to move along the moving path H.

The storage space 11 is a space in which a vehicle can be stored.

For example, the storage space 11 is a parking space in which a vehicle can be stored.

For example, the storage space 11 is a space in which the vehicle support structure on which a vehicle has been placed can be stored.

In FIG. 8, it is illustrated that the plurality of storage spaces 11 is arranged in series on the left and right of the moving path H which will be described later.

The wireless power transfer system 20 is a system that supplies electric power to the vehicle 5.

The wireless power transfer system 20 is an apparatus that supplies electric power to the vehicle 5.

The wireless power transfer system 20 is one of the wireless power transfer systems 100 according to the first to sixth embodiments of the present disclosure.

The power supply primary coil 21 corresponds to the power supply primary coil 111.

The power supply primary coil 21 is provided at a specific position.

One of power supply secondary coils 6, 32 corresponds to the power supply secondary coil 121.

The power supply secondary coil 6 is incorporated in the vehicle 5.

The power supply secondary coil 32 is incorporated in the vehicle support structure 30.

The power supply primary coil 21 is a power supply primary coil that can supply, in a wireless manner, electric power to the power supply secondary coil 6.

The power supply primary coil 21 is provided at the specific position that is at least one particular position on the moving path H.

For example, the power supply primary coil 21 is provided on a bottom surface of the specific position that is at least one particular position on the moving path H.

For example, the power supply primary coil 21 is provided on a side surface of the specific position that is at least one particular position on the moving path H.

A drive circuit 22 is a circuit that supplies electric power to the power supply primary coil 21 to drive the power supply primary coil 21.

To the drive circuit 22, electric power is supplied from a power source apparatus (not illustrated).

When an electric current flows in the power supply primary coil 21, the electric current can be extracted from the power supply secondary coil.

For example, when an alternating current flows in the power supply primary coil 21, the alternating current can be extracted from the power supply secondary coil 6.

The vehicle support structure 30 is a configuration that can support the vehicle 5.

For example, the vehicle 5 can be placed on the vehicle support structure 30.

For example, the vehicle support structure 30 is provided with a right wheel support structure part 31R and a left wheel support structure part 31L.

The right wheel support structure part 31R is a part that supports a pair of front and rear right wheels of the vehicle 5.

The left wheel support structure part 31L is a part that supports a pair of front and rear left wheels of the vehicle 5.

The right wheel support structure part 31R and the left wheel support structure part 31L integrally support the vehicle.

The vehicle support structure 30 is provided with a void Q2 surrounded by a predetermined contour K between the right wheel support structure part 31R and the left wheel support structure part 31L arranged left and right when viewed from above.

In FIG. 10, it is illustrated that the void Q2 surrounded by the rectangular contour K is provided between the right wheel support structure part 31R and the left wheel support structure part 31L.

The right wheel support structure part 31R and the left wheel support structure part 31L each have a running surface S on which the wheels of the vehicle 5 run.

For example, the vehicle support structure 30 may be a structure having a substantially quadrilateral shape when viewed from above that holds the wheels of the vehicle 5 to support the vehicle, and may be provided with the vehicle support structure void Q2 that is the void having the predetermined contour K and penetrating in a vertical direction.

For example, the vehicle support structure 30 is a so-called pallet, and provided with the void Q2 penetrating a central part of the pallet in the vertical direction when viewed from above.

For example, the pallet rolls the wheels provided at a lower part thereof, and can move between a moving carriage main body 41 which will be described later and the storage space 11.

The moving carriage 40 is a carriage that supports the vehicle 5 and moves along the moving path H.

The moving carriage 40 includes the moving carriage main body 41.

The moving carriage main body 41 is a structure capable of supporting the vehicle support structure 30 that supports the vehicle 5, and moving on the moving path H.

A moving carriage void Q1 is formed in the moving carriage main body.

For example, in the moving carriage main body, the moving carriage void Q1 penetrating in an upward direction and a horizontal direction facing a side surface of the main structure on which the power supply primary coil is provided is formed.

The transfer apparatus 50 is an apparatus that can transfer the vehicle 5 between the moving carriage main body 41 and the storage space 11.

The transfer apparatus 50 may be able to transfer the vehicle support structure 30 that supports the vehicle 5 between the moving carriage main body 41 and the storage space 11.

The relay apparatus 70 corresponds to the relay apparatus 130.

The relay apparatus 70 is an apparatus that relays the wireless power transfer from the power supply primary coil 21 to the power supply secondary coil 6.

The relay apparatus 70 is provided so as to be surrounded by the contour K of the moving carriage void Q1.

Since the configuration of the relay apparatus 70 is the same as that described in the wireless power transfer system according to the embodiment of the present disclosure, the description will be omitted.

In FIG. 10, it is illustrated that the moving path H extends horizontally, the power supply primary coil 21 is provided on the side surface of the specific position on the moving path H, the moving carriage 40 supports the vehicle support structure 30 that supports the vehicle 5, and the moving carriage 40 stops at the specific position on the moving path H.

In the drawing, a magnetic flux generated in the power supply primary coil 21 is represented by a broken line.

When the moving carriage 40 stops at the specific position on the moving path H, the posture/position adjustment mechanism may adjust the relative posture or position between the primary coil support member and the secondary coil support member such that the releasing posture is changed to the fitting posture, and the wireless power transfer may be performed from the power supply primary coil 21 to the power supply secondary coil 6 in the fitting posture.

When the moving carriage 40 stops at the specific position on the moving path H, the posture/position adjustment mechanism may adjust the relative posture or position between the primary coil support member and the moving carriage such that the releasing posture is changed to the fitting posture, and the wireless power transfer may be performed from the power supply primary coil 21 to the power supply secondary coil 6 in the fitting posture.

When the moving carriage 40 stops at the specific position on the moving path H, the first posture/position adjustment mechanism may adjust the relative posture or position between the primary coil support member and the moving carriage such that the first releasing posture is changed to the first fitting posture, the second posture/position adjustment mechanism may adjust the relative posture or position between the moving carriage and the secondary coil support member such that the second releasing posture is changed to the second fitting posture, and the wireless power transfer may be performed from the power supply primary coil 21 to the power supply secondary coil 6 in the first fitting posture and the second fitting posture.

Hereinafter, operation of the vehicle power supply device according to the first embodiment of the present disclosure will be described.

Management of the parking device to which the vehicle power supply device is applied includes an entry step, an exit step, and a power supply step.

(Entry Step)

An entry command is received.

The vehicle 5 runs by itself to be placed on the vehicle support structure 30 located in an entry/exit space (not illustrated).

A lifter (not illustrated) moves the vehicle support structure 30 that supports the vehicle 5 from a layer in which the entry/exit space is located to a layer in which the storage space 11 is located.

The transfer apparatus 50 transfers the vehicle support structure 30 that supports the vehicle 5 from the lifter to the moving carriage 40.

The moving carriage 40 supports the vehicle support structure 30 that supports the vehicle 5, and moves on the moving path H.

The moving carriage 40 stops next to one storage space 11.

The transfer apparatus 50 transfers the vehicle support structure 30 that supports the vehicle 5 from the moving carriage 40 to the storage space 11.

(Exit Step)

An exit command is received.

The moving carriage 40 moves along the moving path H to stop next to the storage space 11 in which the vehicle 5 having the exit command is parked.

The transfer apparatus 50 transfers the vehicle support structure 30 that supports the vehicle 5 from the storage space 11 to the moving carriage 40.

The moving carriage 40 moves along the moving path H to a position where the lifter is located.

The transfer apparatus 50 transfers the vehicle support structure 30 that supports the vehicle 5 from the moving carriage 40 to the lifter.

The lifter (not illustrated) moves the vehicle support structure 30 that supports the vehicle 5 from the layer in which the storage space 11 is located to the layer in which the entry/exit space is located.

The vehicle 5 runs by itself to get down from the vehicle support structure 30 located in the entry/exit space (not illustrated).

(Power Supply Step)

A power supply command is received.

The moving carriage 40 moves along the moving path H to stop next to the storage space 11 in which the vehicle 5 having the power supply command is parked.

The transfer apparatus 50 transfers the vehicle support structure 30 that supports the vehicle 5 from the storage space 11 to the moving carriage 40.

The moving carriage 40 moves along the moving path H to the specific position.

The drive circuit 22 drives the power supply primary coil 21, and the wireless power transfer is performed from the power supply primary coil 21 to the power supply secondary coil 6.

The vehicle 5 is charged with the electric power supplied to the power supply secondary coil 6, and outputs a completion signal when the charging is completed.

Upon receiving the completion signal, the moving carriage 40 moves along the moving path H from the specific position, and the moving carriage 40 stops next to one storage space 11.

The transfer apparatus 50 transfers the vehicle support structure 30 that supports the vehicle 5 from the moving carriage 40 to the storage space 11.

Next, a vehicle power supply device according to the second embodiment of the present disclosure will be described based on the drawings.

Figure 11:
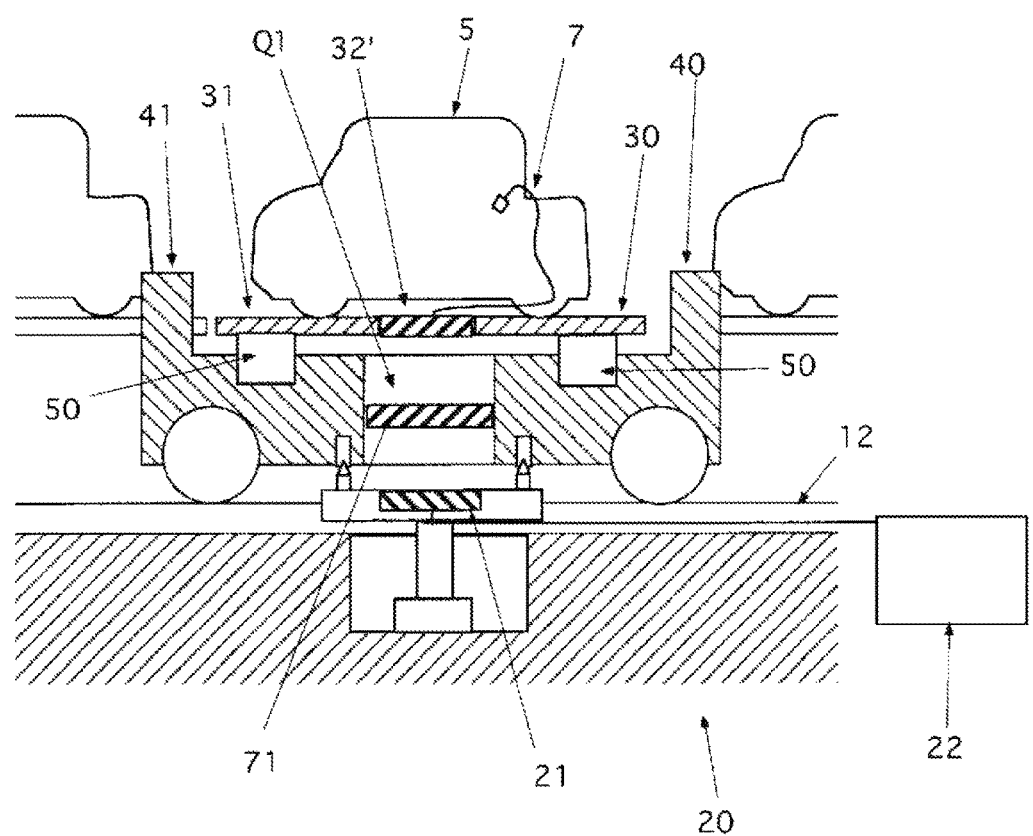
FIG. 11 is a side cross-sectional view of a vehicle power supply device according to the second embodiment of the present disclosure.

FIG. 11 is a side cross-sectional view of the vehicle power supply device according to the second embodiment of the present disclosure.

The vehicle power supply device according to the second embodiment of the present disclosure is a device that supplies electric power to a vehicle capable of receiving power supply.

The vehicle power supply device according to the second embodiment of the present disclosure includes a main structure (not illustrated), a wireless power transfer system 20, a vehicle support structure 30, and a moving carriage 40.

The vehicle power supply device according to the second embodiment of the present disclosure may include the main structure (not illustrated), the wireless power transfer system 20, the vehicle support structure 30, the moving carriage 40, and a relay apparatus 130.

The vehicle power supply device according to the second embodiment of the present disclosure may include the main structure (not illustrated), the wireless power transfer system 20, the vehicle support structure 30, the moving carriage 40, a transfer apparatus 50, and the relay apparatus 130.

Since the main structure (not illustrated), the wireless power transfer system 20, the moving carriage 40, and the transfer apparatus 50 are the same as those of the vehicle power supply device according to the first embodiment, the description will be omitted.

The vehicle support structure 30 is a configuration that can support the vehicle 5, and is provided with the power supply secondary coil 32.

For example, the vehicle 5 can be placed on the vehicle support structure 30.

For example, the vehicle support structure 30 is provided with a right wheel support structure part 31R and a left wheel support structure part 31L.

The right wheel support structure part 31R is a part that supports a pair of front and rear right wheels of the vehicle 5.

The left wheel support structure part 31L is a part that supports a pair of front and rear left wheels of the vehicle 5.

The right wheel support structure part 31R and the left wheel support structure part 31L integrally support the vehicle.

The vehicle support structure 30 is provided with the power supply secondary coil 32 at a void formed between the right wheel support structure part 31R and the left wheel support structure part 31L arranged left and right when viewed from above.

In FIG. 8, it is illustrated that the power supply secondary coil 32 is provided between the right wheel support structure part 31R and the left wheel support structure part 31L.

The right wheel support structure part 31R and the left wheel support structure part 31L each have a running surface S on which the wheels of the vehicle 5 run.

For example, the vehicle support structure 30 may be a structure having a substantially quadrilateral shape when viewed from above that holds the wheels of the vehicle 5 to support the vehicle, and may be provided with the power supply secondary coil 32.

For example, the vehicle support structure 30 is a so-called pallet, and provided with the power supply secondary coil 32 at a central part of the pallet when viewed from above.

For example, the pallet rolls the wheels provided at a lower part thereof, and can move between a moving carriage main body 41 which will be described later and the storage space 11.

The relay apparatus 70 is provided so as to be surrounded by the contour K of the moving carriage void Q1.

Since the configuration of the relay apparatus 70 is the same as that described in the wireless power transfer system according to the embodiment of the present disclosure, the description will be omitted.

When the moving carriage 40 stops at the specific position on the moving path H, the posture/position adjustment mechanism may adjust the relative posture or position between the primary coil support member and the secondary coil support member such that the releasing posture is changed to the fitting posture, the wireless power transfer may be performed from the power supply primary coil 21 to the power supply secondary coil 32 in the fitting posture, and electric power supplied by the wireless power transfer may be supplied to the vehicle.

When the moving carriage 40 stops at the specific position on the moving path H, the posture/position adjustment mechanism may adjust the relative posture or position between the primary coil support member and the moving carriage such that the releasing posture is changed to the fitting posture, the wireless power transfer may be performed from the power supply primary coil 21 to the power supply secondary coil 32 in the fitting posture, and electric power supplied by the wireless power transfer may be supplied to the vehicle 5.

When the moving carriage 40 stops at the specific position on the moving path H, the first posture/position adjustment mechanism may adjust the relative posture or position between the primary coil support member and the moving carriage such that the first releasing posture is changed to the first fitting posture, the second posture/position adjustment mechanism may adjust the relative posture or position between the moving carriage and the secondary coil support member such that the second releasing posture is changed to the second fitting posture, the wireless power transfer may be performed from the power supply primary coil 21 to the power supply secondary coil 32 in the first fitting posture and the second fitting posture, and electric power supplied by the wireless power transfer may be supplied to the vehicle 5.

Since operation of the vehicle power supply device according to the second embodiment of the present disclosure is substantially the same as the operation of the vehicle power supply device according to the first embodiment except for the above-mentioned route for supplying electric power from the power supply primary coil to the vehicle, the description will be omitted.

Next, a vehicle power supply device according to the third embodiment of the present disclosure will be described based on the drawings.

Figure 12:
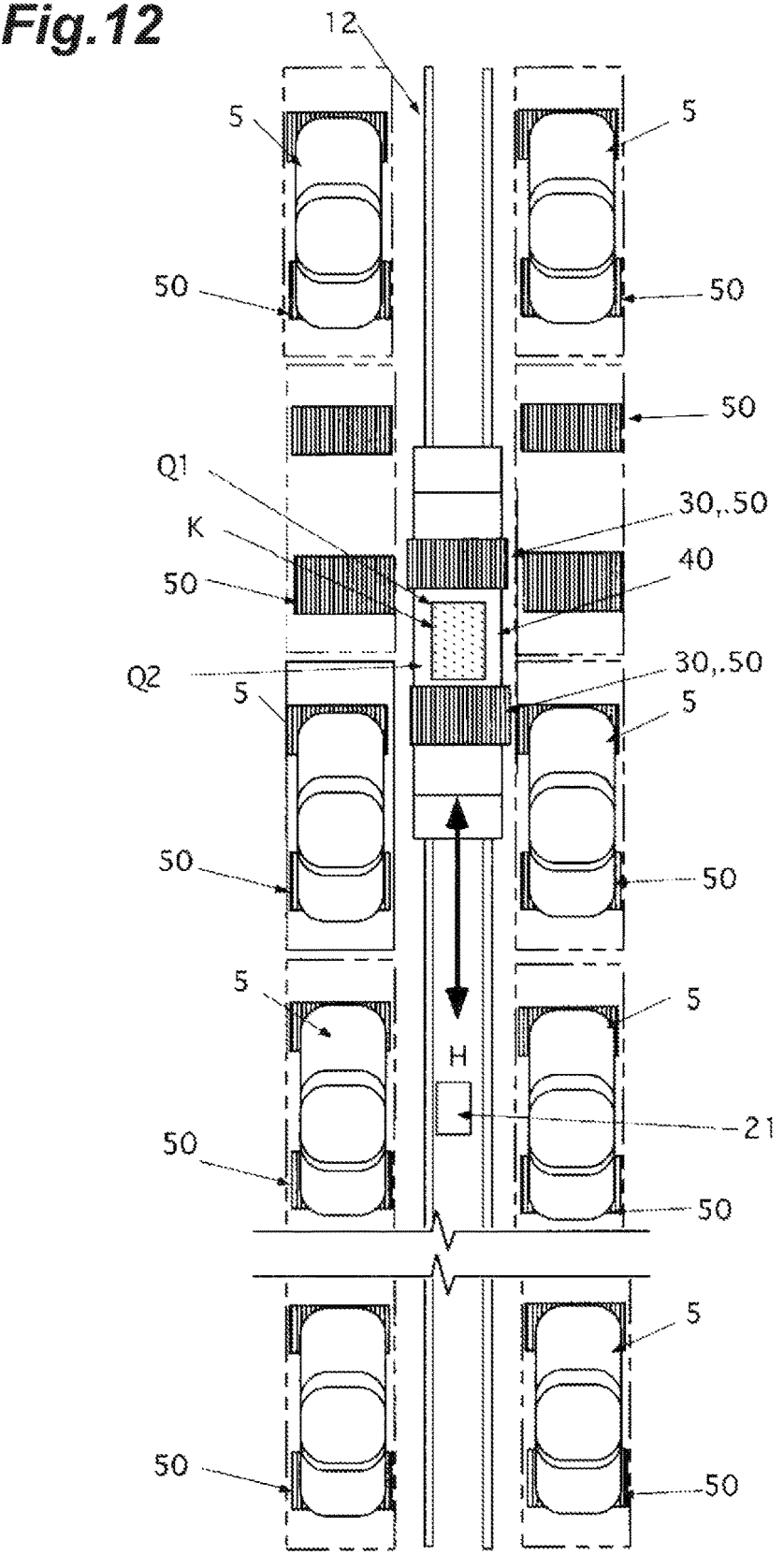
FIG. 12 is a plan view of a vehicle power supply device according to the third embodiment of the present disclosure.

FIG. 12 is a plan view of the vehicle power supply device according to the third embodiment of the present disclosure.

The vehicle power supply device according to the third embodiment of the present disclosure is a device that supplies electric power to a vehicle capable of receiving power supply.

The vehicle power supply device according to the third embodiment of the present disclosure includes a main structure (not illustrated), a wireless power transfer system 20, a vehicle support structure 30, and a moving carriage 40.

The vehicle power supply device according to the third embodiment of the present disclosure may include the main structure (not illustrated), the wireless power transfer system 20, the vehicle support structure 30, the moving carriage 40, and a relay apparatus 130.

The vehicle power supply device according to the third embodiment of the present disclosure may include the main structure (not illustrated), the wireless power transfer system 20, the vehicle support structure 30, the moving carriage 40, a transfer apparatus 50, and the relay apparatus 130.

Since the configurations of a vehicle 5, the main structure (not illustrated), the wireless power transfer system 20, the moving carriage 40, and the relay apparatus 130 are the same as those of the vehicle power supply devices according to the first to second embodiments, the description will be omitted.

The vehicle support structure 30 is a configuration that can support the vehicle 5.

For example, the vehicle support structure 30 includes a pair of conveyers on which the vehicle 5 can be placed.

For example, the vehicle support structure 30 includes a pair of front and rear conveyers.

For example, the vehicle support structure 30 includes a pair of left and right conveyers.

Wheels of the vehicle are placed on the conveyer, so that the conveyer supports the vehicle.

The vehicle support structure 30 is provided, at a position sandwiched between the pair of conveyers, with a vehicle support structure void that is a void having a predetermined contour K and penetrating in a vertical direction.

In FIG. 12, the vehicle support structure including the pair of front and rear conveyers is illustrated.

The transfer apparatus 50 is an apparatus that can transfer the vehicle between the moving carriage main body and the storage space.

The transfer apparatus 50 includes a pair of conveyers.

For example, the transfer apparatus 50 includes a pair of front and rear conveyers.

For example, the transfer apparatus 50 includes a pair of left and right conveyers.

The conveyer of the vehicle support structure 30 and the conveyer of the transfer apparatus 50 operate in cooperation with each other to transfer the vehicle between the conveyer of the vehicle support structure 30 and the conveyer of the transfer apparatus 50.

Since operation of the vehicle power supply device according to the third embodiment is substantially the same as the operation of the vehicle power supply devices according to the first to second embodiments except for the above-mentioned configuration of the vehicle support structure, the description will be omitted.

Next, a vehicle power supply device according to the fourth embodiment of the present disclosure will be described based on the drawings.

Figure 13:
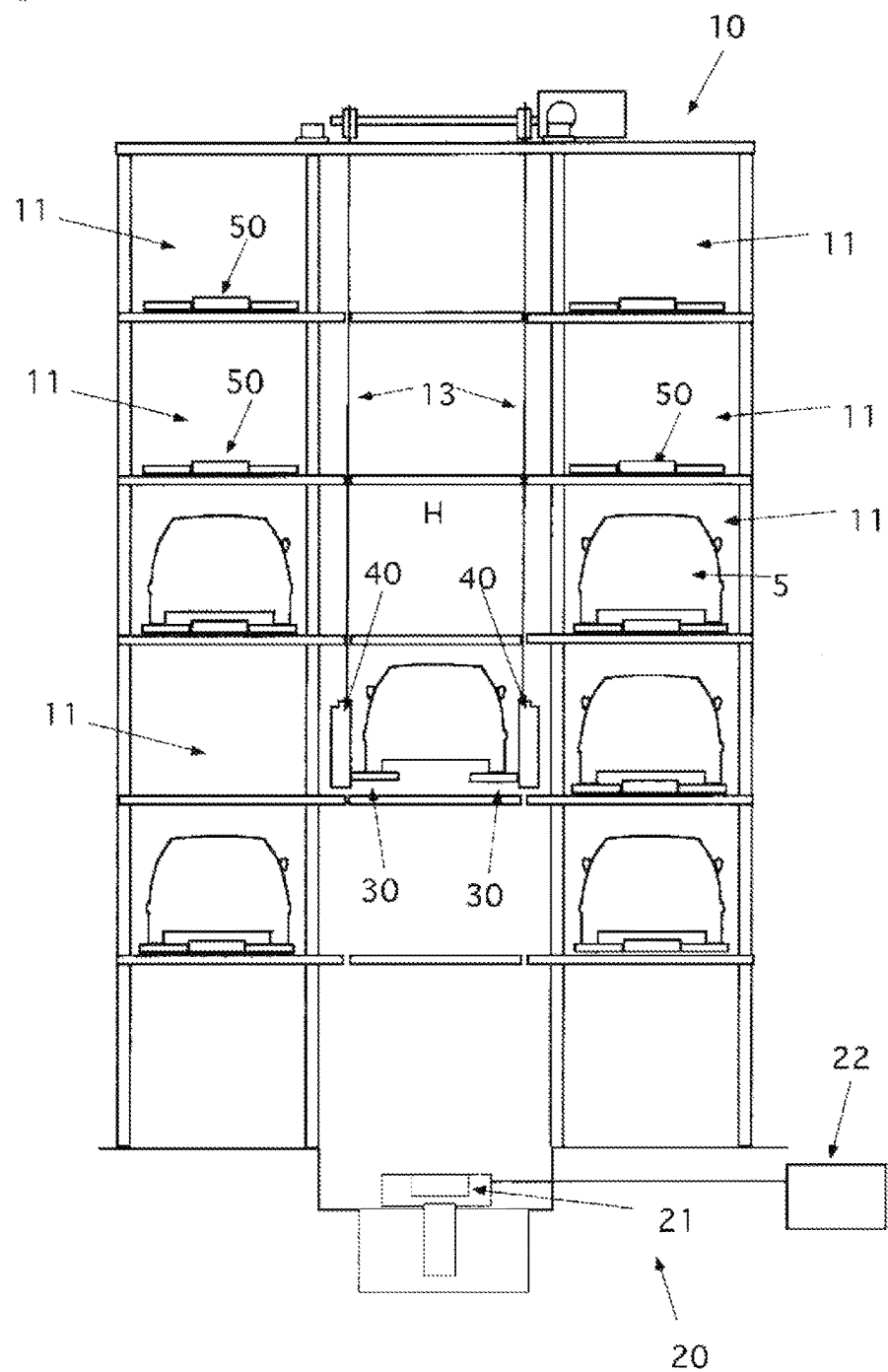
FIG. 13 is a front view of a vehicle power supply device according to the fourth embodiment of the present disclosure.
Figure 14:
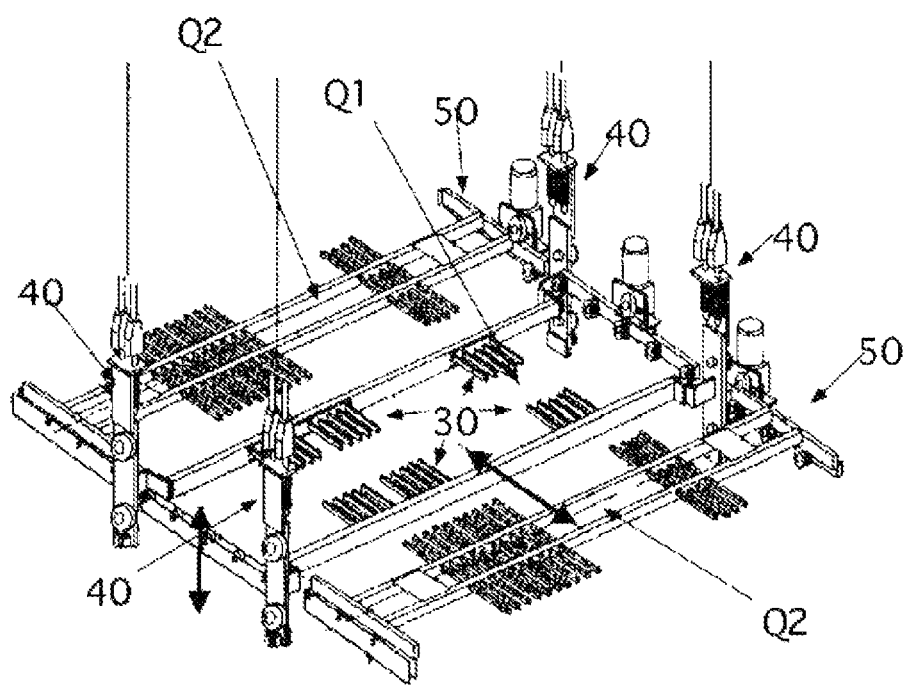
FIG. 14 is a conceptual view of the vehicle power supply device according to the fourth embodiment of the present disclosure.

FIG. 13 is a front view of the vehicle power supply device according to the fourth embodiment of the present disclosure. FIG. 14 is a conceptual view of the vehicle power supply device according to the fourth embodiment of the present disclosure.

The vehicle power supply device according to the fourth embodiment of the present disclosure is a device that supplies electric power to a vehicle capable of receiving power supply.

The vehicle power supply device according to the fourth embodiment of the present disclosure may include a main structure 10, a wireless power transfer system 20, a vehicle support structure 30, and a moving carriage 40.

The vehicle power supply device according to the fourth embodiment of the present disclosure may include the main structure 10, the wireless power transfer system 20, the vehicle support structure 30, the moving carriage 40, and a transfer apparatus 50.

The vehicle power supply device according to the fourth embodiment of the present disclosure may include the main structure 10, the wireless power transfer system 20, the vehicle support structure 30, the moving carriage 40, and a transfer apparatus 50.

Since a vehicle is the same as those of the vehicle power supply devices according to the first to second embodiments, the description will be omitted.

The main structure 10 is a principal structure of the vehicle power supply device.

For example, the main structure 10 is a foundation structure of the vehicle power supply device.

The main structure 10 is provided with a storage space 11 arranged along a moving path H extending in a vertical direction.

The main structure 10 may be provided with a plurality of storage spaces 11.

For example, the main structure 10 includes the plurality of storage spaces 11.

The moving carriage which will be described later moves along the moving path H in the vertical direction.

The storage space 11 is a space in which a vehicle can be stored.

For example, the storage space 11 is a parking space in which a vehicle can be stored.

For example, the storage space 11 is a space in which the vehicle support structure on which a vehicle has been placed can be stored.

In FIG. 13, it is illustrated that the plurality of storage spaces 11 is arranged in series in the vertical direction on the left and right of the moving path H which will be described later.

The wireless power transfer system 20 is an apparatus that supplies electric power to the vehicle 5.

A power supply primary coil 21 is a power supply primary coil that can supply, in a wireless manner, electric power to a power supply secondary coil.

The power supply primary coil 21 is provided at a specific position that is at least one particular position on the moving path H.

For example, the power supply primary coil 21 is provided at the lowermost part of the moving path H.

For example, the power supply primary coil 21 is provided on a side surface of the lowermost part of the moving path H.

For example, the power supply primary coil 21 is provided on a wall in the middle of the moving path H.

Since a drive circuit 22 is the same as that of the vehicle power supply device according to the first embodiment, the description will be omitted.

The vehicle support structure 30 is a configuration that can support the vehicle 5.

For example, the vehicle 5 can be placed on the vehicle support structure 30.

The vehicle support structure 30 includes a pair of comb-shaped support members.

For example, the vehicle support structure 30 includes a pair of left and right comb-shaped support members.

The pair of left and right comb-shaped support members has a plurality of rod-shaped members arranged in a front-rear direction so as to hold wheels of the vehicle and support the vehicle.

In FIG. 14, it is illustrated that the vehicle support structure 30 is configured such that each of the pair of left and right comb-shaped support members has the plurality of rod-shaped members on which front wheels and rear wheels of the vehicle are placed, is supported by the moving carriage 40, and is capable of moving on the moving path H in the vertical direction.

The vehicle support structure 30 is provided, at a position sandwiched between the pair of left and right comb-shaped support members, with a vehicle support structure void that is a void having a predetermined contour K when viewed from above and penetrating in the vertical direction.

The moving carriage 40 is a carriage that supports the vehicle 5 and moves along the moving path H.

The moving carriage 40 includes a moving carriage main body (not illustrated).

The moving carriage main body 41 is a structure capable of supporting the vehicle support structure 30 that supports the vehicle 5, and moving on the moving path H in the vertical direction.

Since other configurations of the moving carriage are the same as those of the vehicle power supply devices according to the first to second embodiments, the description will be omitted.

The transfer apparatus 50 is an apparatus that can transfer the vehicle 5 between the moving carriage main body 41 and the storage space 11.

The transfer apparatus 50 can move between the moving carriage main body 41 that has stopped on the moving path H and the storage space 11.

The transfer apparatus 50 has a plurality of rod-shaped members that can support the wheels of the vehicle 5.

Since operation of the vehicle power supply device according to the fourth embodiment is the same as the operation of the vehicle power supply device according to the first embodiment except for the above-mentioned moving path that extends in the vertical direction and the configuration of the vehicle support structure, the description will be omitted.

Next, a vehicle power supply device according to the fifth embodiment of the present disclosure will be described based on the drawings.

Figure 15:
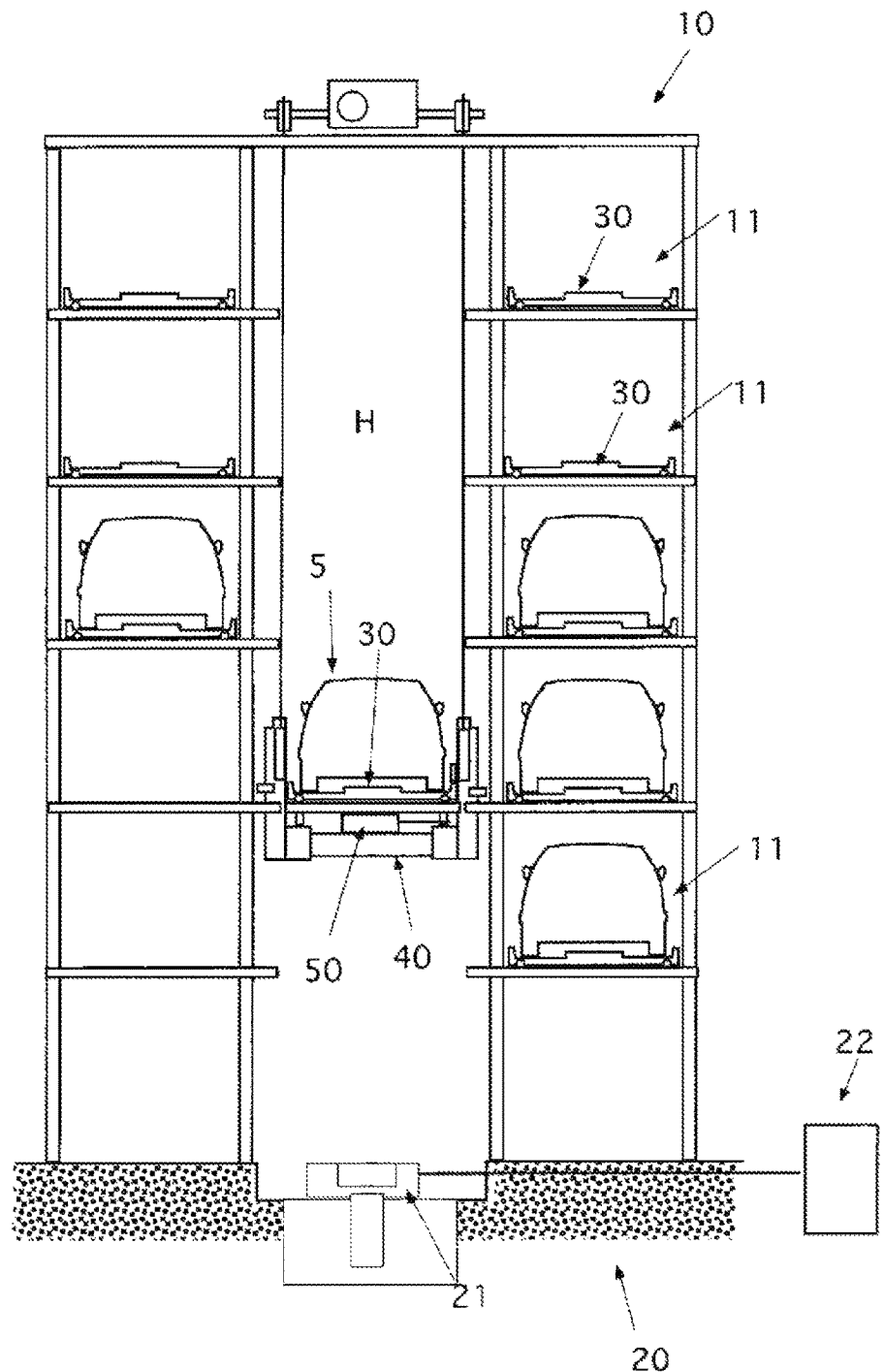
FIG. 15 is a front view of a vehicle power supply device according to the fifth embodiment of the present disclosure.
Figure 16A:
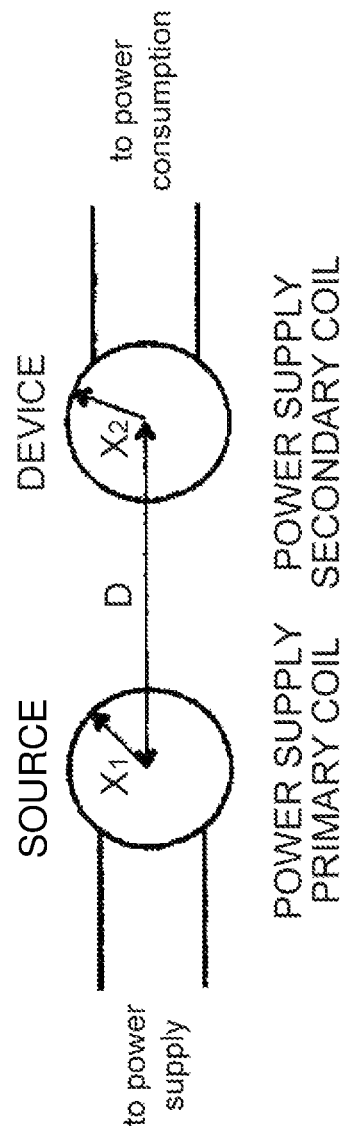
FIGS. 16A and 16B are conceptual diagrams of the wireless power transfer system.
Figure 16B:
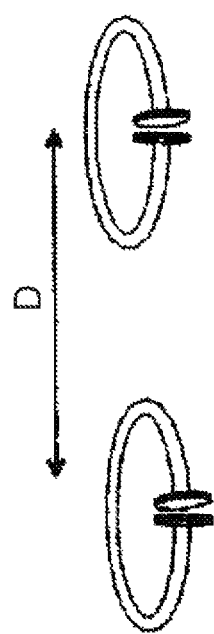

FIG. 15 is a front view of the vehicle power supply device according to the fifth embodiment of the present disclosure.

The vehicle power supply device according to the fifth embodiment of the present disclosure is a device that supplies electric power to a vehicle capable of receiving power supply.

The vehicle power supply device according to the fifth embodiment of the present disclosure may include a main structure 10, a wireless power transfer system 20, a vehicle support structure 30, and a moving carriage 40.

The vehicle power supply device according to the fifth embodiment of the present disclosure may include the main structure 10, the wireless power transfer system 20, the vehicle support structure 30, the moving carriage 40, and a transfer apparatus 50.

Since a vehicle, the vehicle support structure 30, the moving carriage 40, the transfer apparatus 50, and a relay apparatus 130 are the same as those of the vehicle power supply devices according to the first to fourth embodiments, the description will be omitted.

The main structure 10 is a principal structure of the vehicle power supply device.

For example, the main structure 10 is a foundation structure of the vehicle power supply device.

The main structure 10 is provided with a storage space 11 arranged along a moving path H extending in a vertical direction.

The main structure 10 may be provided with a plurality of storage spaces 11.

For example, the main structure 10 includes the plurality of storage spaces 11.

The moving carriage which will be described later moves along the moving path H in the vertical direction.

The storage space 11 is a space in which a vehicle can be stored.

For example, the storage space 11 is a parking space in which a vehicle can be stored.

For example, the storage space 11 is a space in which the vehicle support structure on which a vehicle has been placed can be stored.

In FIG. 15, it is illustrated that the plurality of storage spaces 11 is arranged in series in the vertical direction on the left and right of the moving path H which will be described later.

The wireless power transfer system 20 is an apparatus that supplies electric power to the vehicle 5.

A power supply primary coil 21 is a power supply primary coil that can supply, in a wireless manner, electric power to a power supply secondary coil.

The power supply primary coil 21 is provided on a side surface of a specific position that is at least one particular position on the moving path H.

For example, the power supply primary coil 21 is provided on a side surface of the lowermost part of the moving path H.

For example, the power supply primary coil 21 is provided on a wall in the middle of the moving path H.

Since a drive circuit 22 is the same as that of the vehicle power supply device according to the first embodiment, the description will be omitted.

Since operation of the vehicle power supply device according to the fifth embodiment is substantially the same as the operation of the vehicle power supply device according to the first embodiment except for the moving path that extends in the vertical direction, the description will be omitted.

The wireless power transfer system according to the embodiment of the present disclosure has the following effects owing to its configuration.

The relative posture or position between the primary coil support member 140 and the secondary coil support member 150 is adjusted so as to become the fitting posture in which the fitting member 142 provided at the primary coil support member 140 that supports the power supply primary coil 111 is fit with the fit member 152 provided at the secondary coil support member 150 that supports the power supply secondary coil 121. The wireless power transfer is performed from the power supply primary coil 111 to the power supply secondary coil 121 in this posture. Therefore, the relative posture or position between the power supply primary coil 111 and the power supply secondary coil 121 is adjusted, and the wireless power transfer can be efficiently performed from the power supply primary coil 111 to the power supply secondary coil 121.

The relative posture or position between the primary coil support member 140 and the moving body 174 is adjusted so as to become the fitting posture in which the fitting member 142 provided at the primary coil support member 140 that supports the power supply primary coil 111 is fit with the fit member 152 provided at the moving body 174 that supports the power supply secondary coil 121 at the predetermined position in the predetermined posture. The wireless power transfer is performed from the power supply primary coil 111 to the power supply secondary coil 121 in this posture. Therefore, the relative posture or position between the power supply primary coil 111 and the power supply secondary coil 121 is adjusted, and the wireless power transfer can be efficiently performed from the power supply primary coil 111 to the power supply secondary coil 121.

The relative posture or position between the primary coil support member 140 and the moving body 174 is adjusted so as to become the first fitting posture in which the first fitting member 142a provided at the primary coil support member 140 that supports the power supply primary coil 111 is fit with the first fit member 152a provided at the moving body 174. The relative posture or position between the moving body 174 and the secondary coil support member 150 is adjusted so as to become the second fitting posture in which the second fitting member 142b provided at the moving body 174 is fit with the second fit member 152b provided at the secondary coil support member 150 that supports the power supply secondary coil 121. The wireless power transfer is performed from the power supply primary coil 111 to the power supply secondary coil 121 in this posture. Therefore, the relative posture or position between the power supply primary coil 111 and the power supply secondary coil 121 is adjusted, and the wireless power transfer can be efficiently performed from the power supply primary coil 111 to the power supply secondary coil 121.

The vehicle power supply device according to the embodiment of the present disclosure has the following effects owing to its configuration.

When the moving carriage 40 stops at the specific position on the moving path H, the relative posture or position between the primary coil support member and the secondary coil support member is adjusted so as to become the fitting posture in which the fitting member provided at the primary coil support member that supports the power supply primary coil 21 provided at the specific position is fit with the fit member provided at the secondary coil support member that supports the power supply secondary coil 6 provided at the vehicle 5. The wireless power transfer is performed from the power supply primary coil 21 to the power supply secondary coil 6 in this posture. Therefore, the relative posture or position between the power supply primary coil 21 and the power supply secondary coil 6 is adjusted, and electric power can be efficiently supplied to the vehicle 5 supported by the moving carriage 40 that moves along the moving path.

When the moving carriage 40 stops at the specific position on the moving path, the relative posture or position between the primary coil support member and the secondary coil support member is adjusted so as to become the fitting posture in which the fitting member provided at the primary coil support member that supports the power supply primary coil 21 provided at the specific position is fit with the fit member provided at the secondary coil support member that supports the power supply secondary coil 32 provided at the vehicle support structure 30. The wireless power transfer is performed from the power supply primary coil 21 to the power supply secondary coil 32 in this posture, and electric power supplied by the wireless power transfer is supplied to the vehicle 5. Therefore, the relative posture or position between the power supply primary coil 21 and the power supply secondary coil 32 is adjusted, and electric power can be efficiently supplied to the vehicle 5 supported by the moving carriage 40 that moves along the moving path H.

When the moving carriage 40 stops at the specific position on the moving path H, the relative posture or position between the primary coil support member and the moving carriage 40 is adjusted so as to become the fitting posture in which the fitting member provided at the primary coil support member that supports the power supply primary coil 21 provided at the specific position is fit with the fit member provided at the moving carriage 40 that supports the vehicle 5. The wireless power transfer is performed from the power supply primary coil 21 to the power supply secondary coil 6 in this posture. Therefore, the relative posture or position between the power supply primary coil 21 and the power supply secondary coil 6 is adjusted, and electric power can be efficiently supplied to the vehicle 5 supported by the moving carriage 40 that moves along the moving path H.

When the moving carriage 40 stops at the specific position on the moving path H, the relative posture or position between the primary coil support member and the vehicle 5 is adjusted so as to become the fitting posture in which the fitting member provided at the primary coil support member that supports the power supply primary coil 21 provided at the specific position is fit with the fit member provided at the vehicle support structure 30 that supports the power supply secondary coil 32. The wireless power transfer is performed from the power supply primary coil 21 to the power supply secondary coil 32 in this posture, and electric power supplied by the wireless power transfer is supplied to the vehicle 5. Therefore, the relative posture or position between the power supply primary coil 21 and the power supply secondary coil 32 is adjusted, and electric power can be efficiently supplied to the vehicle 5 supported by the moving carriage 40 that moves along the moving path H.

When the moving carriage 40 stops at the specific position on the moving path H, the relative posture or position between the primary coil support member and the moving carriage 40 is adjusted so as to become the first fitting posture in which the first fitting member provided at the primary coil support member that supports the power supply primary coil 21 provided at the specific position is fit with the second fit member provided at the moving carriage 40 that supports the vehicle 5. The relative posture or position between the moving carriage and the secondary coil support member is adjusted so as to become the second fitting posture in which the second fitting member provided at the moving carriage 40 is fit with the second fit member provided at the secondary coil support member that supports the power supply secondary coil 6 provided at the vehicle 5. The wireless power transfer is performed from the power supply primary coil 21 to the power supply secondary coil 6 in this posture. Therefore, the relative posture or position between the power supply primary coil 21 and the power supply secondary coil 6 is adjusted, and electric power can be efficiently supplied to the vehicle supported by the moving carriage 40 that moves along the moving path H.

When the moving carriage 40 stops at the specific position on the moving path H, the relative posture or position between the primary coil support member and the vehicle 5 is adjusted so as to become the fitting posture in which the first fitting member provided at the primary coil support member that supports the power supply primary coil 21 provided at the specific position is fit with the first fit member provided at the vehicle support structure 30 that supports the power supply secondary coil 32. The relative posture or position between the moving carriage 40 and the secondary coil support member is adjusted so as to become the second fitting posture in which the second fitting member provided at the moving carriage 40 is fit with the second fit member provided at the secondary coil support member that supports the power supply secondary coil 32 provided at the vehicle support structure 30. The wireless power transfer is performed from the power supply primary coil 21 to the power supply secondary coil 32 in this posture, and electric power supplied by the wireless power transfer is supplied to the vehicle 5. Therefore, the relative posture or position between the power supply primary coil 21 and the power supply secondary coil 32 is adjusted, and electric power can be efficiently supplied to the vehicle 5 supported by the moving carriage 40 that moves along the moving path H.

The present disclosure is not limited to the above-mentioned embodiments, and can be variously changed in a range not deviating from the gist of the disclosure.

Although an exemplary case where the vehicle power supply device includes the relay apparatus has been described, the present disclosure is not limited to this exemplary case. The vehicle power supply device may not include the relay apparatus.

A plate made of a material that does not affect the magnetic field may cover the void.

Although an exemplary case where the present disclosure is applied to the parking device has been described, the present disclosure is not limited to this exemplary case. For example, such a case may be employed that the transfer apparatus or the storage space is not included.

Although an exemplary case where a moving mechanism of the parking device is configured to be an elevator parking device has been described, the present disclosure is not limited to this exemplary case. For example, a circulation mechanism may be employed, such as a box circulation parking device, a horizontal circulation parking device, a merry-go-round parking device, an elevator sliding parking device, a plane reciprocating parking device, a transporting storage parking device, and a two-stage or multiple-stage parking device.

INDUSTRIAL APPLICABILITY

According to some aspects of the present disclosure, position displacement is suppressed and electric power can be efficiently supplied.

REFERENCE SIGNS LIST

H moving path
Q1 moving carriage void
Q2 vehicle support structure void
K contour
5 vehicle
6 power supply secondary coil
7 charging cable
10 main structure
11 storage space
12 moving rail
20 wireless power transfer system
21 power supply primary coil
22 drive circuit
30 vehicle support structure
31 vehicle support structure main body
31L left wheel support structure part
31R right wheel support structure part
32 power supply secondary coil
40 moving carriage
41 moving carriage main body
44 power storage apparatus
50 transfer apparatus
70 relay apparatus
71 relay coil
100 wireless power transfer system
110 power supply apparatus
111 power supply primary coil
112 drive circuit
120 power receiving apparatus
121 power supply secondary coil
122 load
130 relay apparatus
131 relay coil
140 primary coil support member
141 primary coil support member main body
142 fitting member
142a first fitting member
142b second fitting member
150 secondary coil support member
151 secondary coil support member main body
152 fit member 152a first fit member
152b second fit member
160 posture/position adjustment mechanism
160a first posture/position adjustment mechanism
160b second posture/position adjustment mechanism
171 object
172 object support structure
173 charging cable
174 moving body

The invention claimed is:

1. A wireless power transfer system comprising:
a power receiving apparatus having a power supply secondary coil that is a coil circuit configured to perform wireless power transfer, the power receiving apparatus being configured to supply electric power to a load;
a power supply apparatus having a power supply primary coil that is a coil circuit configured to perform the wireless power transfer, and a drive circuit that drives the power supply primary coil;
a primary coil support member provided with a fitting member that is fit with a fit member, the primary coil support member being configured to support the power supply primary coil;
a moving body provided with the fit member with which the fitting member is fit;
an object being separate from the primary coil support member and the moving body, the power supply secondary coil being installed in the object; the moving body being configured to support the object with the power supply secondary coil at a predetermined position in a predetermined posture; and
a posture/position adjustment mechanism configured to adjust a relative posture or position between the primary coil support member and the moving body to change the posture between a releasing posture and a fitting posture, the releasing posture being such a posture that the fitting member releases the fit member, the fitting posture being such a posture that the fitting member is fit with the fit member, wherein
when the moving body supports the object with the power supply secondary coil in the object at the predetermined position in the predetermined posture and is located between the power supply primary coil and the power supply secondary coil, the posture/position adjustment mechanism adjusts the relative posture or position between the primary coil support member and the moving body such that the releasing posture is changed to the fitting posture, and the power supply apparatus performs the wireless power transfer from the power supply primary coil to the power supply secondary coil in the fitting posture.

2. The wireless power transfer system according to claim 1, further comprising:
a relay coil installed in the moving body, the relay coil configured to relay the wireless power transfer from the power supply primary coil to the power supply secondary coil.

* * * * *